United States Patent [19]
Konishi et al.

[11] Patent Number: 5,940,636
[45] Date of Patent: Aug. 17, 1999

[54] APPARATUS USING A FILM CARTRIDGE HAVING AN INDICATOR FOR INDICATING AN EXPOSURE CONDITION OF A FILM

[75] Inventors: Yoshito Konishi, Sakai; Nobuharu Murashima, Nara; Takuya Ueno, Hashimoto; Hisanori Itoh, Sakai, all of Japan

[73] Assignee: Minolta Co., Ltd., Osaka, Japan

[21] Appl. No.: 08/790,983

[22] Filed: Jan. 29, 1997

[30] Foreign Application Priority Data

| Jan. 30, 1996 | [JP] | Japan | 8-014701 |
| Jan. 31, 1996 | [JP] | Japan | 8-038785 |
| Jan. 31, 1996 | [JP] | Japan | 8-038786 |

[51] Int. Cl.$^6$ ............ G03B 7/24; G03B 19/02; G03B 17/26
[52] U.S. Cl. ............ 396/207; 396/389; 396/408; 396/409; 396/515
[58] Field of Search .......... 396/207, 389, 396/390, 404, 405, 407, 408, 409, 406, 410, 515

[56] References Cited

U.S. PATENT DOCUMENTS

| 4,939,531 | 7/1990 | Sawamura et al. | 396/346 |
| 5,255,034 | 10/1993 | Shimada et al. | 396/406 |
| 5,321,455 | 6/1994 | Cocca | 354/207 |
| 5,347,334 | 9/1994 | Smart et al. | 354/275 |
| 5,457,510 | 10/1995 | Yamazaki et al. | 396/405 |
| 5,483,310 | 1/1996 | Tanii et al. | 354/21 |
| 5,548,359 | 8/1996 | Wakabayashi | 396/516 |
| 5,555,050 | 9/1996 | Wakabayashi et al. | 396/406 |
| 5,598,236 | 1/1997 | Ueda et al. | 396/319 |

*Primary Examiner*—Eddie C. Lee
*Attorney, Agent, or Firm*—McDermott, Will & Emery

[57] ABSTRACT

An apparatus using a film cartridge in a system that a leading portion of a film contained in a cartridge is thrust to be conveyed from the cartridge, wherein an indicator showing an exposure condition is reset to an original state when an initial loading, which is executed on a film cartridge loading in an apparatus, is not executed normally, and the film is rewound, thus, it indicates "unexposed" when a new film cartridge is loaded. While, when a winding up operation is not executed normally during a photographing, a film is rewound and an indicator showing an exposure condition, is set so as to indicate that the film is exposed. Thus, it prevents from causing a double exposure.

27 Claims, 21 Drawing Sheets

APPARATUS USING A FILM CARTRIDGE HAVING AN INDICATOR FOR INDICATING AN EXPOSURE CONDITION OF A FILM

BACKGROUND OF THE INVENTION

1. Field of the Invention

The present invention relates to an apparatus using a film cartridge wherein a film is contained in a cartridge and a lead portion of the film is thrust and fed out of the cartridge.

2. Description of the Prior Art

Conventionally, a camera has been provided wherein such a film cartridge of a thrusting system is employed. Before the film cartridge is loaded in a camera body, the whole film including a lead portion of the film is contained in the cartridge, and when an initial loading is executed, which is done on a film loading in a camera body, a shaft of the film is driven, a lead portion of the film is thrust (film thrusting operation), and it is conveyed to a winding spool. Further, in the film cartridge, a recording section where photographing information is able to be recorded magnetically is arranged correspondingly to each film frame.

In a camera using such a film cartridge, it is able to use a used film cartridge by loading it again on a camera and feeding to a position of an unexposed frame after the film is rewound in its halfway such that not all frames are photographed (exposed). As the whole film including its lead portion is contained in the cartridge, an indicator is equipped for showing a usage (exposure) condition of the film so as to be seen from outside of the cartridge so that the film cartridge would be used again. As for the indicator, for example, an indicator may be employed, wherein it shows an exposure condition by means of an angle position of an index, which rotates with a film winding shaft arranged at an edge plane in a cartridge shaft direction, and the like. Moreover, as a bar code plate, which a cartridge data is coded, is also arranged so as to be rotatable with a film winding shaft unitedly, it is able to read and control an exposure condition of a film by detecting an angle position of the bar code plate and controlling so that the plate would stop at a predetermined angle position. It is constructed so that an indicator turns over its indication from "unexposed" to "exposed" after the film cartridge is loaded in a camera, an initial loading is executed once, and it is rewound and taken out.

However, in such a camera using the above-mentioned film cartridge, there is a case that an initial loading operation, which is executed by a film feeding mechanism on loading a cartridge in the camera, can not be executed (a fail of film thrusting) due to some condition, for example; a condition that a film winding up operation can not be executed normally due to an abnormal stop of a feeding motor on winding up operation in each release, or a condition that a magnetic recording, which is executed on winding operation, is not executed normally. When such conditions occurs, a sequence for rewinding and taking out the film cartridge may be executed so as to proceed to a re-initial loading. In such a case, if an indicator showing an exposure condition is set its indication at "exposed" in accordance to a film rewinding, it is unfavorable because the film has not used (unexposed film).

To the contrary, it is possible to set an indicator so as to show "partially exposed" and use a film again. Although in case that an operation for feeding to an unexposed frame can not be executed normally, and a double exposing may be occurred, since there is a possibility that a magnetically recorded data is abnormal.

SUMMARY OF THE INVENTION

The present invention is made to solve the above-mentioned problems, and an object of the present invention is to provide an apparatus, wherein it is able to use a film cartridge effectively by resetting an indication of an indicator to an original content when a film is rewound to proceed a re-initial loading operation in case that an initial loading is not executed normally, which is executed on a film cartridge loading in a camera, preventing from indicating that the cartridge is "exposed". Further, the present invention is made to provide an apparatus, wherein it is able to prevent a double exposure and prevent a photographed content by setting an indication state of an indicator showing an exposure condition at "exposed", not setting at "partially exposed" and the like when a film winding can not be executed normally on a film winding operation at each release operation and the film has rewound.

Accordingly, a purpose of the present invention is to obtain a more convenient construction for users by connecting a film rewinding operation with an ejecting operation.

According to one aspect of the present invention, an apparatus wherein a film is contained in a cartridge and a lead portion of the film is thrust and conveyed out of the cartridge and the apparatus employs a film cartridge having an indicator for indicating an exposure condition of a film, comprises; a feeder which thrust a lead portion of a film from the film cartridge loaded in a camera body, a detector which detects an abnormal initial loading of a film executed by the feeder, and a controller which controls so as to rewind a film when an abnormality is detected at an initial loading by the detector and to reset an indicator to an original indication state.

Further, according to another aspect of the present invention, an apparatus wherein a film is contained in a cartridge and a lead portion of the film is thrust and conveyed out of a cartridge and the apparatus employs a film cartridge having an indicator for showing an exposure condition of a film, comprises; a winder which winds up one film frame after a release operation, a recorder which inputs a photographing information on a film during a winding operation by the winder, a detector which detects that a film winding up operation is not executed normally by the winder, and a controller which controls so as to stop a film winding up operation when an abnormal winding operation is detected by the detector, to rewind the film and to set an indicator at an indication of "exposed".

Furthermore, according to further aspect of the present invention, an apparatus comprises; a cartridge chamber which contains a cartridge and ejects the contained cartridge so as to be taken out, a detector which detects that a film is used to the end, a commander which commands a film rewinding to a cartridge regardless the detection that a film is used to the end by the detector, a rewinder which rewinds a film to a cartridge accordingly when it is detected that a film is used to the end by the detector or a film rewinding is commanded by the commander, and a controller which controls so as not to eject the cartridge chamber even after a completion of a rewinding when a rewinding is executed based on the detection that a film is used to the end by the detector and to eject the cartridge chamber after a completion of rewinding when a rewinding is executed by the commander.

DETAILED DESCRIPTION OF THE PREFERRED EMBODIMENTS

Figure 1:
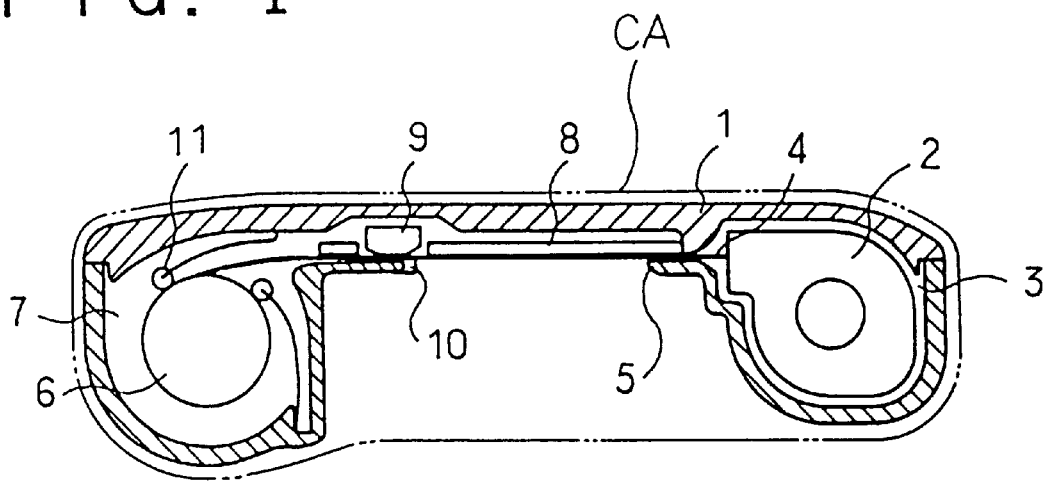
FIG. 1 is a schematic horizontal sectional view of a camera of the first embodiment.

Now, a first embodiment of the present invention will be explained referring to the drawings from FIG. 1 to FIG. 13.

FIG. 1 is a schematic horizontal sectional view of a camera in the first embodiment. A camera body 1 of the camera CA comprises a cartridge chamber 3 where a film cartridge 2 is loaded, a photographing frame 5 having an aperture where a film 4 is fed and an image is formed by exposing, a spool chamber 7 where a winding spool 6 is disposed, and the like. A pressure plate 8 is arranged behind the film 4 at the photographing frame 5, and a magnetic head 9 and a pad 10 are arranged at a downstream side in the film winding up direction, and a film roller 11, which presses the film 4 wound up to the winding spool 6, is arranged in the spool chamber 7. A photographing lens (not shown) and the like are arranged at the photographing frame frontward of the camera. Further, a cover case (shown in a chain line) surrounds the camera body 1.

Figure 2:
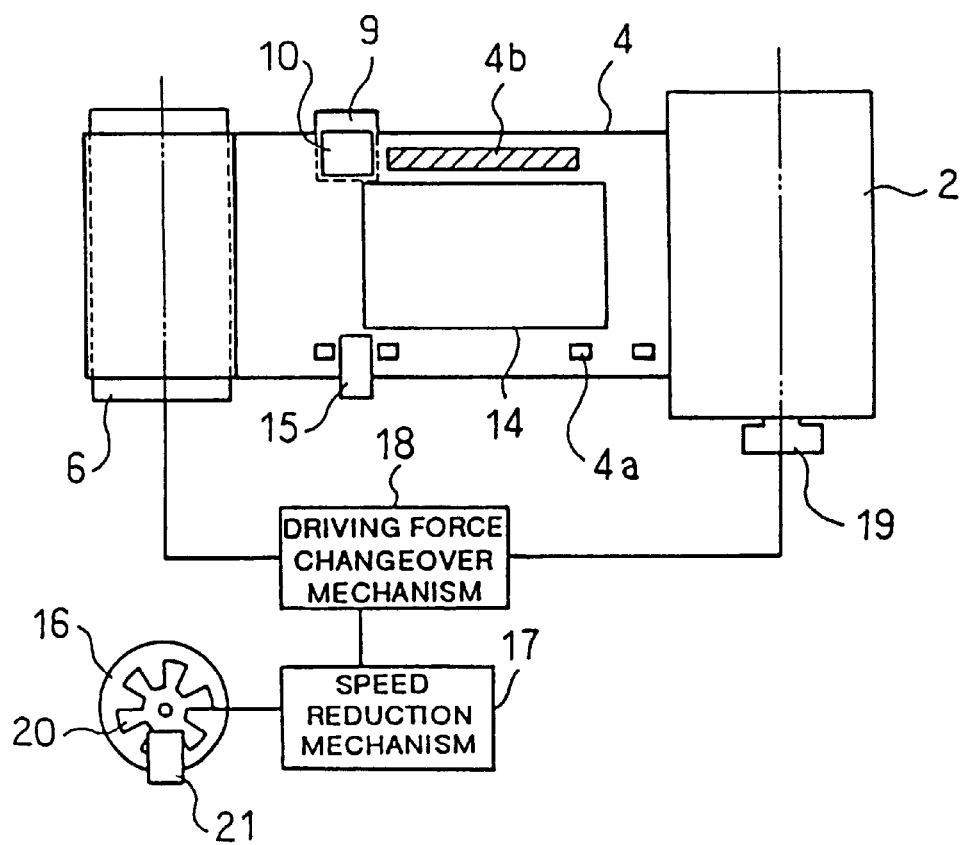
FIG. 2 is a view showing a structure of film feeding system of the camera.

FIG. 2 shows a structure of a film feeding system of the camera. As shown in the figure, a perforation 4a is disposed on the film 4 so as to correspond to a position of each film frame, and a perforation sensor 15, which counts the perforation 4a on the fed film 4 optically, is arranged on the camera. Further, a magnetic recording section 4b (track) is arranged behind the film 4 so as to correspond to a position of the magnetic head 9 and each frame 14. Moreover, a feeding motor 16 is arranged for feeding and rewinding the film 4, and its output is connected with the winding spool 6 and a winding folk 19 through a speed reduction system 17 and a driving force changeover mechanism 18. Furthermore, a blade wheel 20 and a motor rotation amount sensor 21 are arranged in order to detect an amount of rotation of the feeding motor 16.

Figure 3:
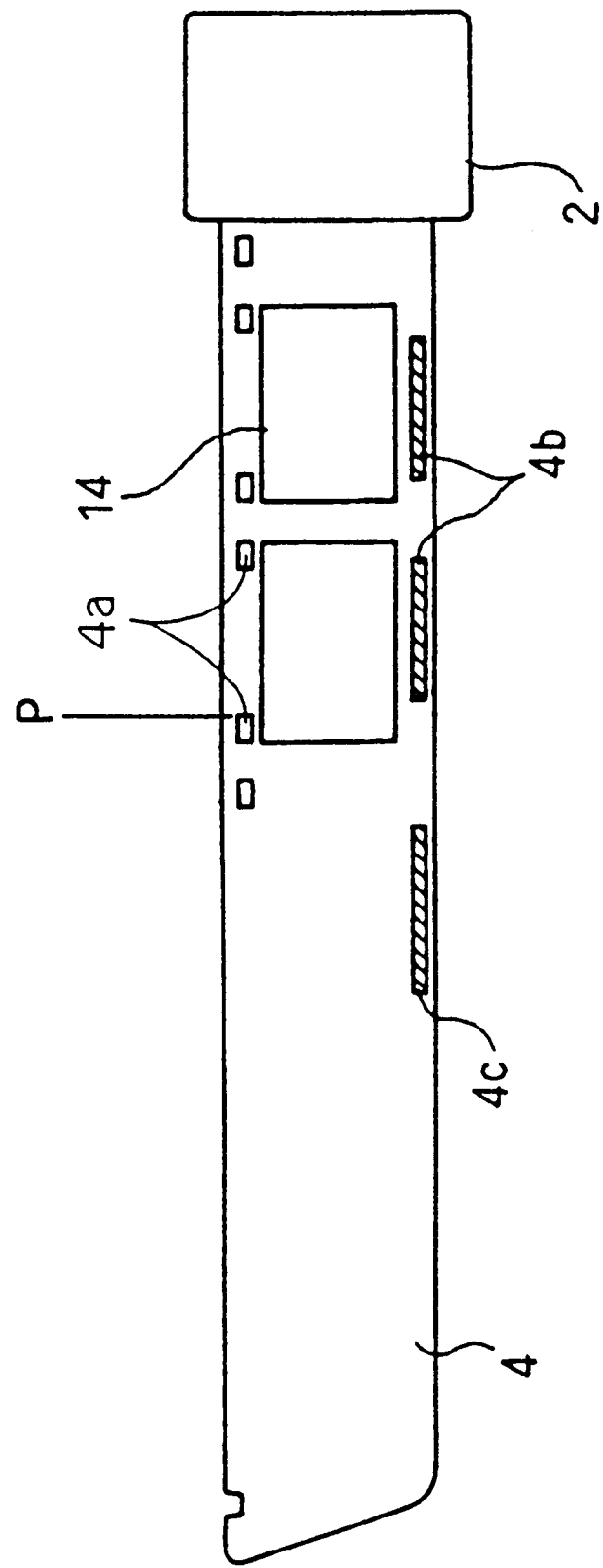
FIG. 3 is a schematic constructional view showing a state that a lead portion of a film of a film cartridge, which is used in the camera, is fed out.

FIG. 3 is a schematic structure showing a state that a lead portion of a film of a film cartridge, which is employed in the present camera, is fed out. In a film cartridge before loading in the camera, the film 4 is contained in the cartridge 2 completely, and when it is loaded in the camera and an initial loading is executed for conveying a film to a winding spool, a lead portion of the film 4 is thrust by a rotation drive of a shaft where the film 4 is wound (film thrusting operation), and it is conveyed out of the cartridge 2. On the film 4, a perforation 4a is arranged at both sides of a film frame 14 correspondingly, and the film 4 is positioned for the photographing frame 5 of the camera (FIG. 1) based on an edge "P" of the perforation 4a, which corresponds to each film frame, and a film frame 14 is exposed. Further, on a magnetic track 4c disposed on a lead portion of a film, a lead portion magnetic recording data, which is a common data in the film, is recorded, and on the magnetic track 4b disposed correspondingly to the each frame 14, a frame data, which corresponds to each frame, is recorded.

Figure 4:
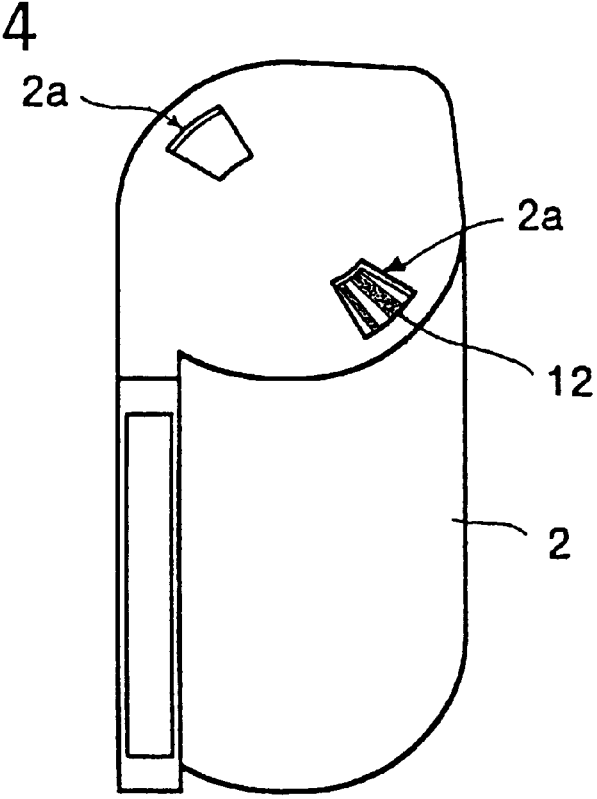
FIG. 4 is a perspective view of a film cartridge.
Figure 5:
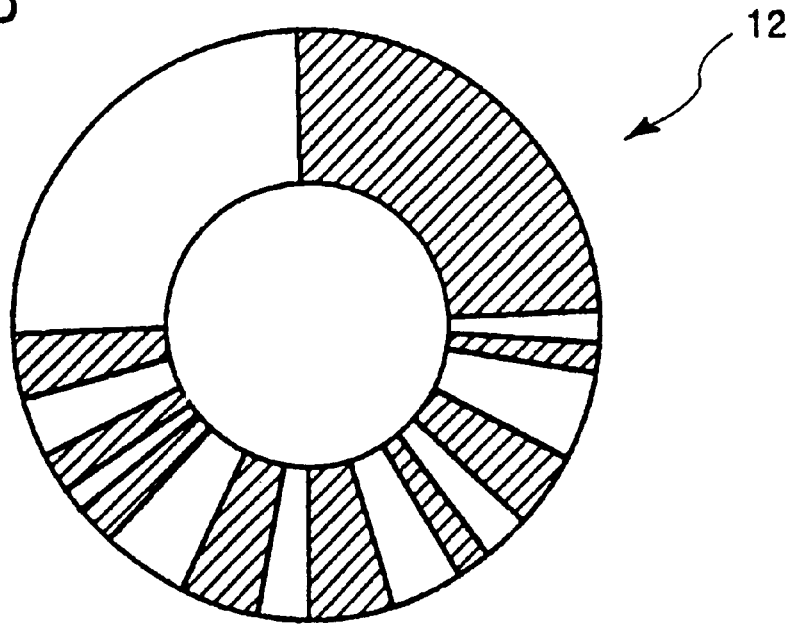
FIG. 5 is a top view of an indication means.

In the cartridge 2, an indicator is disposed, wherein it indicates an exposure condition of a film (unexposed, partially exposed, entirely exposed, developed, and so on) and a cartridge data. In order to indicate such a information, for example, as shown in FIG. 4 and FIG. 5, a bar code plate 12, which rotates with a film winding spool of the film cartridge, is disposed at an end plane of the cartridge 2, and a bar code which is shown at an indication window 2a of the cartridge 2, indicates a cartridge data such as a kind of a film, a film sensitiveness, a fixed number of film frame and the like. At the same time, an indicator may be employed, which indicates an exposure condition based on a position where the film winding spool is stopped. Further, on the camera body, a pair of bar code sensors 34 and 35 (FIG. 7), which read out the bar code, are arranged at a different rotation phase.

Figure 6:
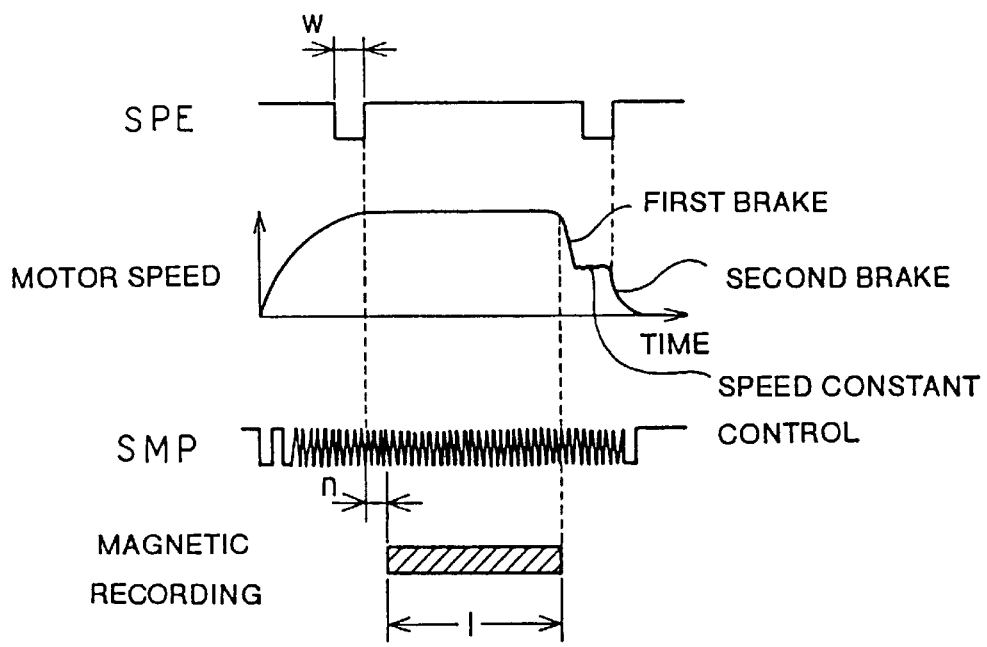
FIG. 6 is a time chart of one frame rewinding operation.

FIG. 6 is a time chart of one film frame winding up operation. SPE is a detected signal of the perforation 4a by the perforation sensor 15 and SMP is a motor pulse signal of a motor rotation amount sensor 21 in the motor 16. As shown in the figure, after counting a predetermined pulse (n) of the motor pulse SMP from a first leading edge of the perforation signal SPE, a magnetic recording is started. A feeding speed by the feeding motor 16 is calculated by monitoring a width (time) of the motor pulse signal SMP just before a magnetic recording or monitoring a width (w) of the first pulse of the perforation signal SPE. As amount of data to be recorded magnetically is predetermined, a frequency of a magnetic recording signal for recording all data on a length (1) is decided when a feeding speed is in a predetermined value. Here, a magnetic recording scope (1) is made to be contained within a predetermined length of one frame. After a magnetic recording is completed, the motor 16 is put on a first brake and reduces its speed once, and then controls so as to keep a regular speed by means of PWM and the like, then put on a second brake and stop the film feeding when a second leading edge of the perforation sensor signal SPE is detected.

Figure 7:
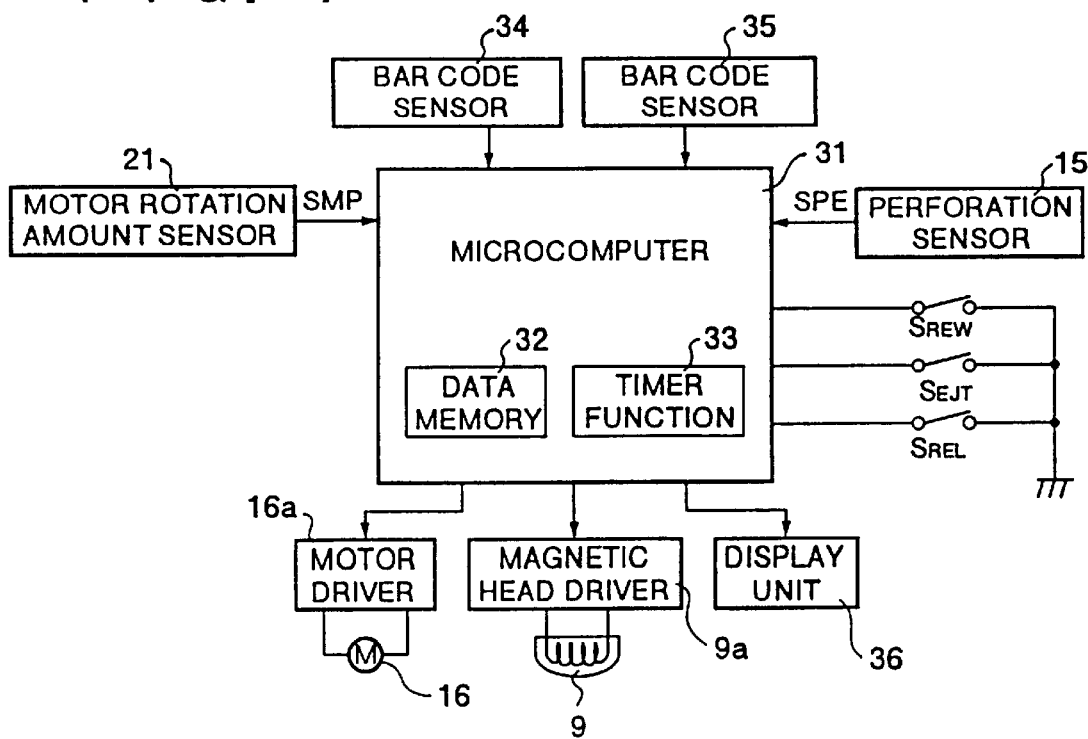
FIG. 7 is a block diagram showing a schematic structure for controlling the camera.

FIG. 7 is a block diagram showing a schematic structure for controlling a camera. A microcomputer 31 controls an overall camera and provides a timer function 33 and a data memory function 32. The microcomputer 31 controls a drive of the feeding motor 16 through the motor driver 16a on receiving a motor pulse SMP from the motor rotation amount sensor 21, a detected signal from the bar code sensors 34 and 35, a perforation signal SPE from the perforation sensor 15, a signal from a halfway rewinding switch SREW, a signal from a switch SEJT for ejecting a cartridge chamber, a signal from a release switch SREL and signals from the other various switches. Further, the microcomputer 31 executes a magnetic recording and reading out by the magnetic head 9 through the magnetic head driver 9a, and it controls so as to indicate data and the like at an indicator unit 36.

Figure 8:
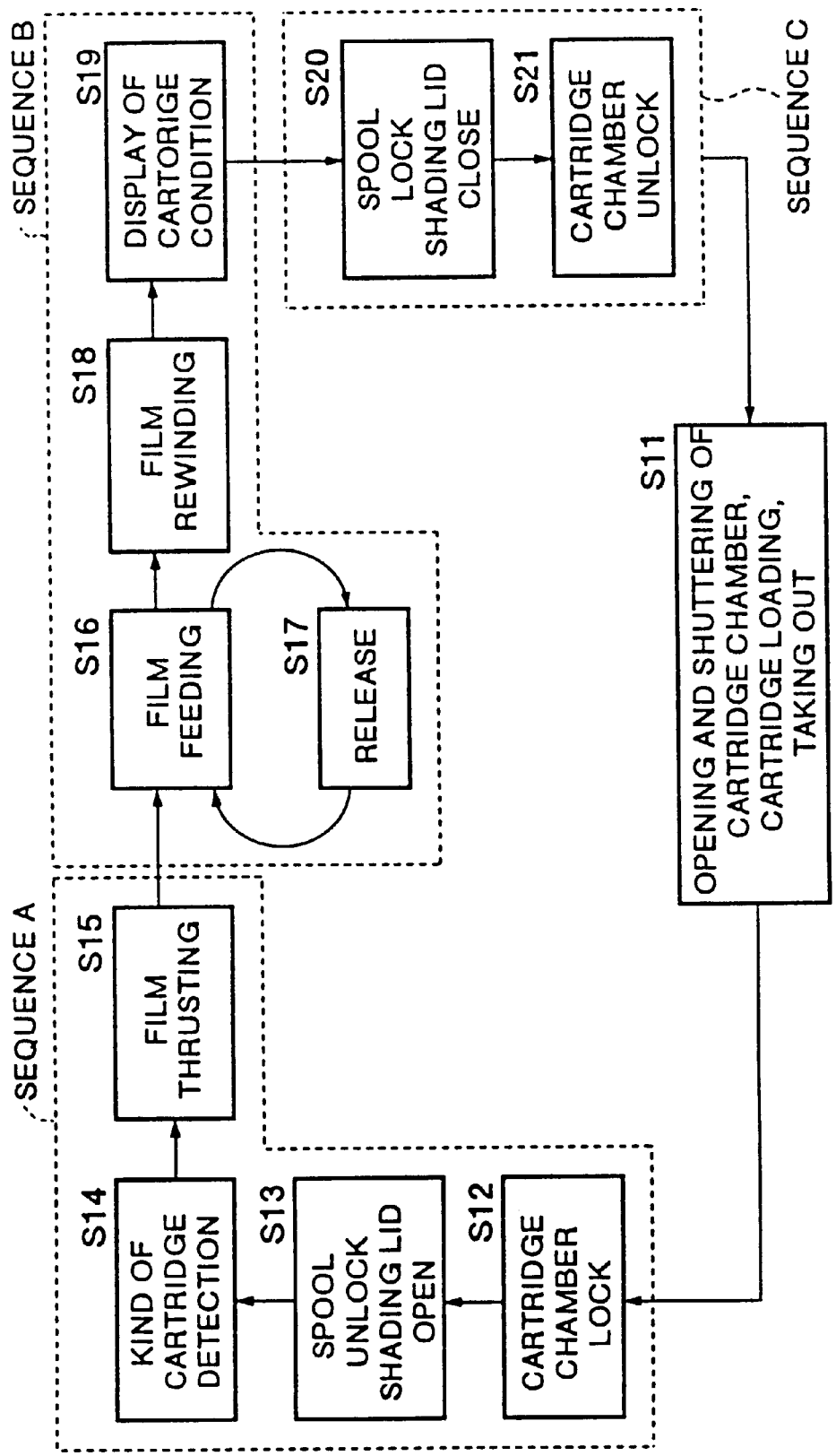
FIG. 8 is a flowchart when a film cartridge is used in a camera.
Figure 9:
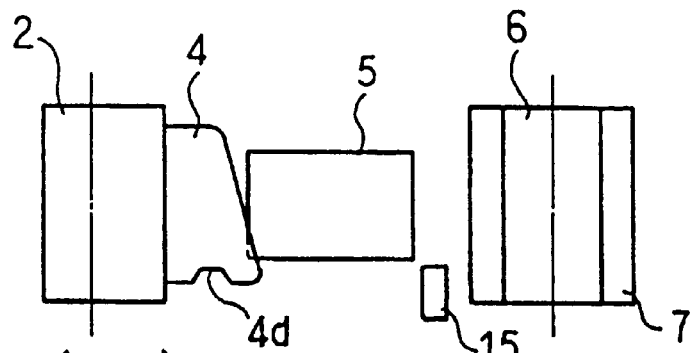
FIGS. 9(a) to 9(d) are views showing a state that a lead portion of a film is thrust from a film cartridge and it is conveyed to a winding up spool at film thrusting operation.
Figure 9:
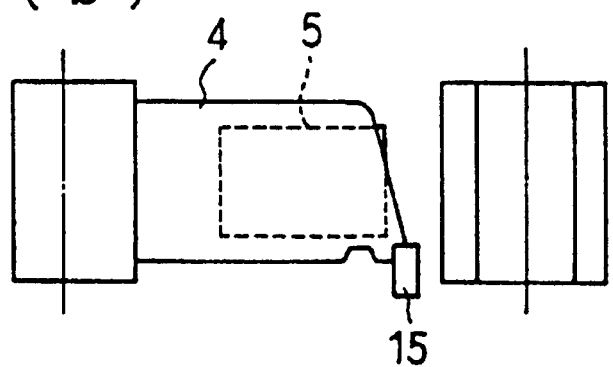
Figure 9:
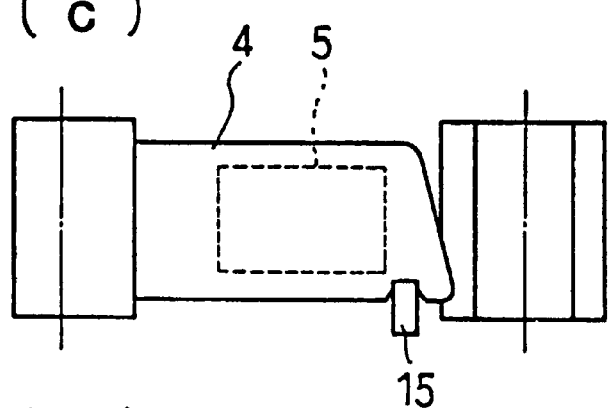
Figure 9:
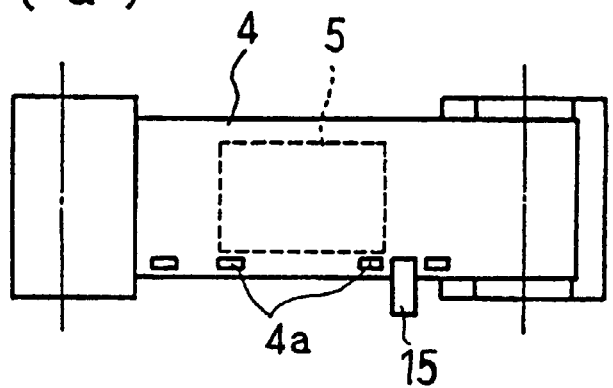

FIG. 8 is a flowchart when a film cartridge is used in a camera. As for an opening and closing a cartridge chamber of a camera at a step S11 and a loading and taking out the cartridge, a user executes these operations manually. Steps from S12 to S15 in a sequence A is a sequence executed in a camera after loading a cartridge. A shading lid is disposed at an exit of a film of the film cartridge, and when the shading lid is opened, a locked winding spool is unlocked due to a structures inside the cartridge. As for judgment of a kind of a film at a step S14, it is executed by reading out a bar code. By reading out a cartridge data such as a film sensitiveness, a fixed number of film frames, and the like based on decipher of a bar code, and at the same time by detecting an initial phase of the bar code plate (phase before rotation), it is detected whether the film in the cartridge is unexposed, partially exposed, entirely exposed and so on. As for a film thrusting at a step S15, it means that an initial loading is executed such that a lead portion of a film is thrust from the cartridge 2 (FIG. 1) and it is conveyed to the winding spool 6. According to the present embodiment, when there occurs a problem during the film thrusting operation, a relief is provided (details will be explained later).

Further, the present camera is able to use again a film cartridge, wherein the film is rewound at halfway of the film roll, and when a halfway rewinding is executed, an indication "partially exposed" is shown at the indicator of the cartridge. Thus, when a cartridge is used again, since an indication of "partially exposed" is detected at the step S14 for detecting a kind of a film, the film is fed to a position of a first unexposed frame of the film. As a photographing data has been recorded magnetically on the magnetic track 4b (FIG. 3) corresponding to each frame by the magnetic head 9, the feeding to a position of a unexposed frame can be executed by detecting whether a data signal exists or not on the magnetic track 4b.

Steps from S16 to S19 in a sequence B is a sequence of a shutter release, a film winding, and a film rewinding. According to the present embodiment, it provides a relief when a problem occurs during a film winding at the step S16 (details will be explained later). At an indication of the cartridge condition at the step S19, it indicates whether a film is exposed, partially exposed, unexposed and so on in accordance to a position where the winding spool of the cartridge is stopped after executing a film rewinding. Steps S20 and S21 in a sequence C is a sequence of taking out a film cartridge.

Now, as for an initial loading by the film thrusting operation (S15) at the above-mentioned sequence A, it will be explained in detail referring to FIGS. 9(a) to 9(d) and FIG. 10. FIG. 9(a), FIG. 9(b), FIG. 9(c), and FIG. 9(d) show states that a lead portion of a film is thrust from the cartridge 2 and conveyed to the winding spool 6 at the film thrusting operation. Here, a notch 4d is arranged near a lead portion of a film in order to prevent that the film is note able to be thrust due to a sticking or an idle running when the film contained in a film cartridge is thrust completely.

Figure 10:
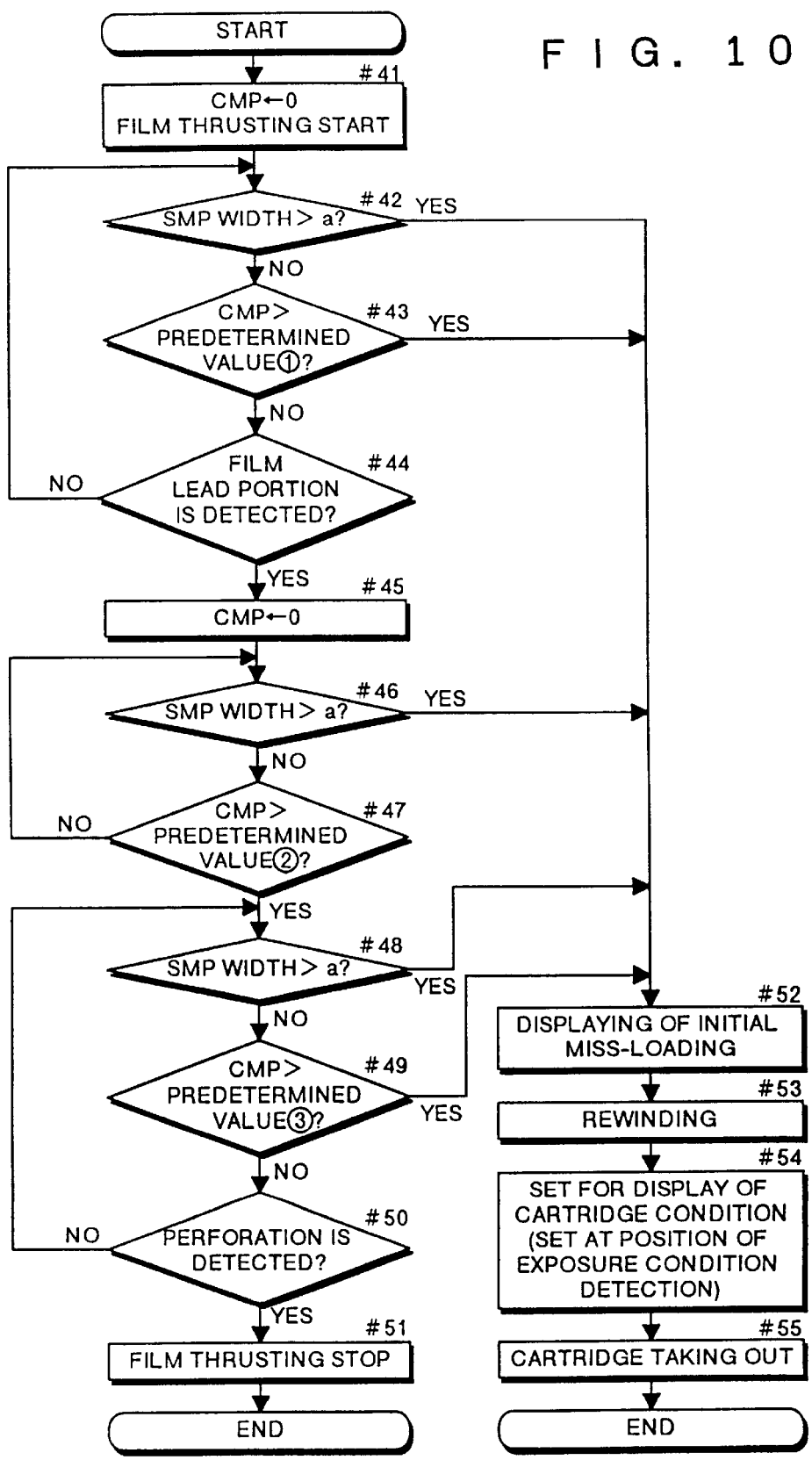
FIG. 10 is a flowchart showing a film thrusting procedure.

FIG. 10 is a flowchart showing a procedure of a film thrusting operation. This procedure is executed when it is detected that a film in a cartridge is unexposed or partially exposed at the detection of the step S14. In the procedure, first of all, it reset the counter CMP for counting a motor pulse SMP to "0", and it starts a film thrusting operation (#41). Then, the counter CMP starts calculating an amount of a film feeding until a lead portion of a film is detected. Thereafter, it is detected whether a width of the motor pulse SMP is bigger than a predetermined time (a) (#42). This detection is for judging that the feeding motor 16 is stopped in case that a next trailing edge does not occur even though the predetermined time (a) passed from a trailing edge of the motor pulse SMP (same as an up edge), and when it is judged YES, it means that an initial loading is failed, and then it proceeds to a procedure for treating a failed initial loading after #52. When it is judged NO at #42, then, it is judged whether a value of the counter CMP is bigger that a predetermined value [1] or not (#43). This judgment is for judging that an initial film thrusting has failed when a lead portion of a film is not detected regardless of a film thrusting operation more than the predetermined value [1], and if it is judged YES, it means that an initial loading is failed and it proceeds to the procedure for failed initial loading after #52 as same as above. When it is judges NO at the judgment of #43, next, it is detected whether a lead portion of a film is detected based on leading edge of signal from the perforation sensor 15 (#44). When the lead portion of a film can not be detected, it returns to #42, and a procedure of a loop of #42 and #43 is executed.

When it is able to detect a lead portion of a film, it executes resetting the counter CMP in order to count an amount of film feeding after passing of the film's lead portion (#45). Then, as same as #42, a detection of a width of the motor pulse SMP is executed (#46), and it is detected whether an initial loading is failed or not due to motor stop. In case that an initial loading is failed, its following procedure is same as above. Next, it is judged whether a value of the counter CMP is bigger than a predetermined value [2] (#47). This judgment is to continue a film thrusting operation not executing a perforation detection during the predetermined value [2] from a lead portion of a film, preventing from mistaking the notch 4d near the lead portion of a film for the perforation 4a. When it is detected NO at the judgment of #47, it returns to #46. It is able to execute the judgment of #47 by judging whether a passed time from resetting the counter CMP at #45 is over a predetermined time.

When it is detected YES at the judgment #47, it is detected again the detection of a width of the motor pulse SMP (#48) as same as #42, further, when the perforation 4a is not detected regardless of a film thrusting more than a predetermined value [3] after a lead portion of a film is passed, it is judged that the film thrusting is failed (#49~#50). The detection of the perforation 4a is executed by a trailing edge signal from the perforation sensor 15. When the perforation 4a is detected, a film thrusting operation is stopped (#51). Consequently, a film feeding to a first frame is completed. Thereafter, it proceeds to a procedure of a shutter release preparation.

In the above-mentioned sequence, an amount of a film feeding is calculated by counting the motor pulse SMP by means of the counter CMP (#43, #49), and it may be calculated by using a read out signal of a bar code from the bar code sensors 34 and 35. As the bar code plate rotates with the winding spool of the cartridge, the read out signal of the bar code plate 12 corresponds to an amount of a film feeding. The same method may be employed in a judgment for problem occurred during a film winding procedure.

When an initial loading has failed, it indicates that the initial loading is failed (#52), then, it executes a film rewinding procedure (FIG. 8, S18) in the sequence B (#53). Further, an indicating condition (stopping phase) of an indicator of the cartridge (bar code plate in FIG. 5) is set (#54). After the procedure of #54, it proceeds to a sequence for taking out of a cartridge (#45), and the procedure is finished. When an initial loading is failed, at setting the cartridge condition indicator (#54), it returns to a same indication (same stopping phase) as a content of judgment of an initial usage condition of a cartridge by a detection of a kind of film cartridge at S14 in the sequence A. As a failing of the initial loading is a problem before entering a main use condition, so it is favorable to return the indicator such as above in order to use a film cartridge effectively.

Figure 11:
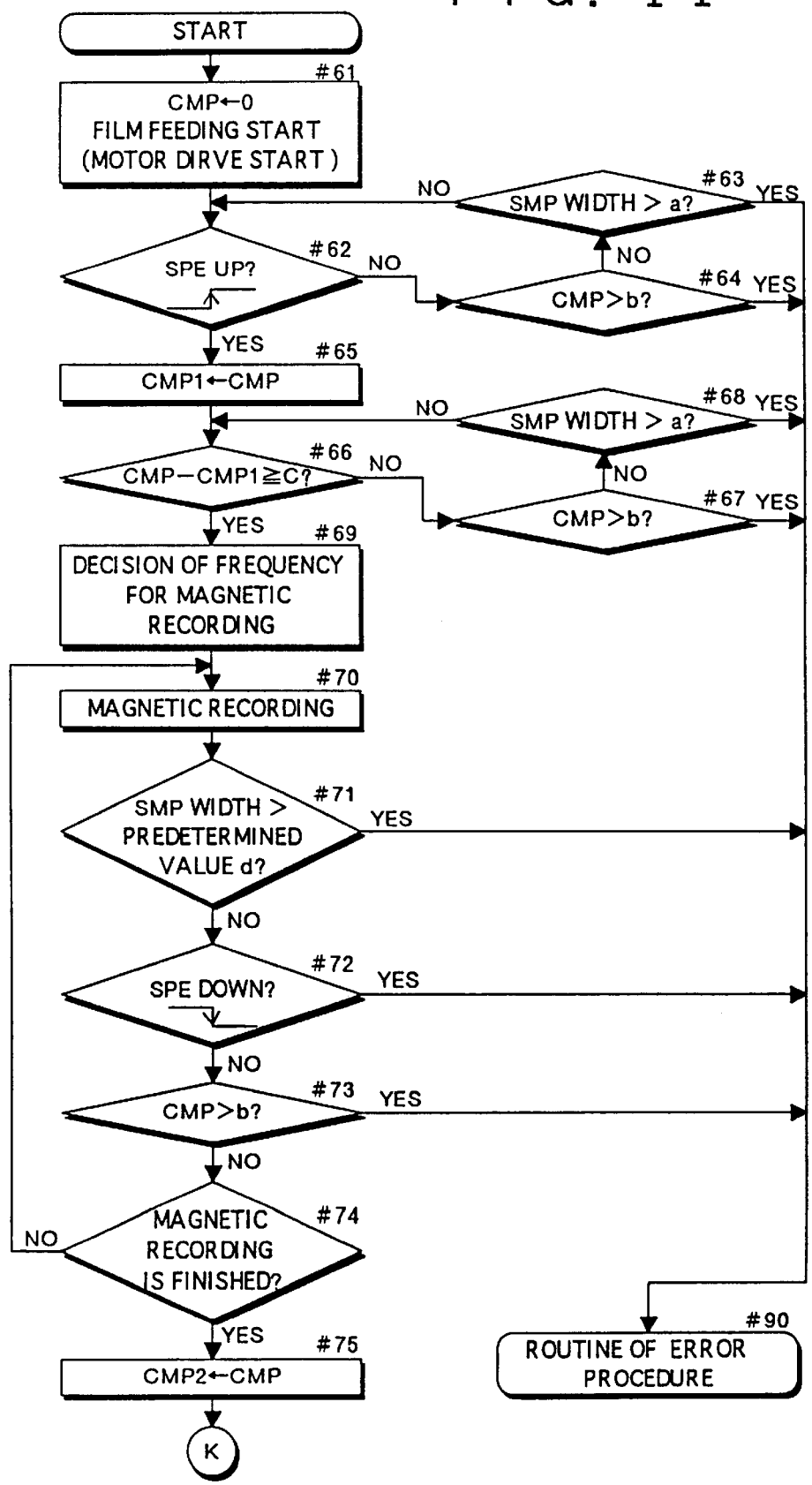
FIG. 11 is a flowchart showing a film winding up procedure.
Figure 12:
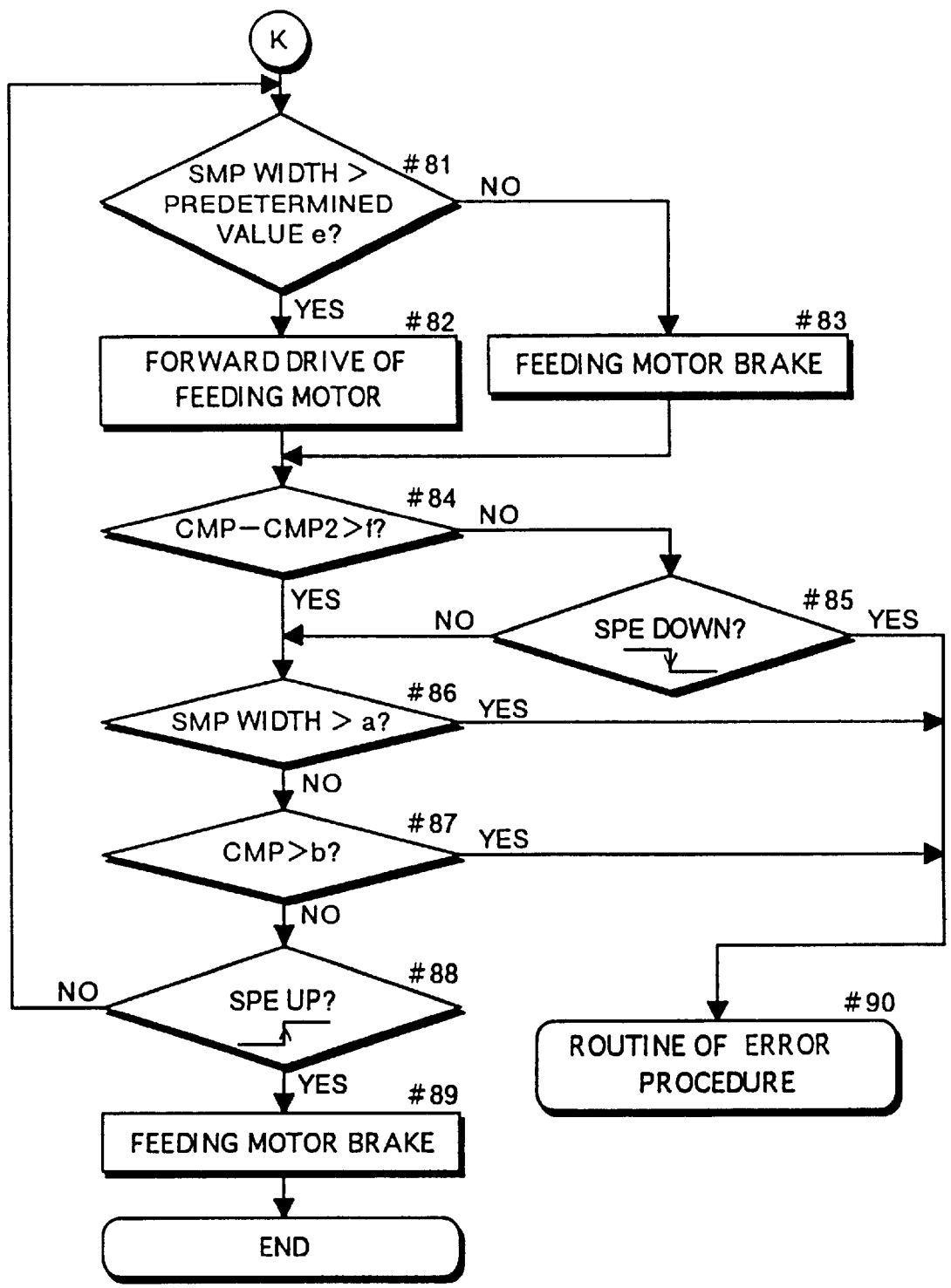
FIG. 12 is a flowchart showing a film rewinding procedure.
Figure 16:
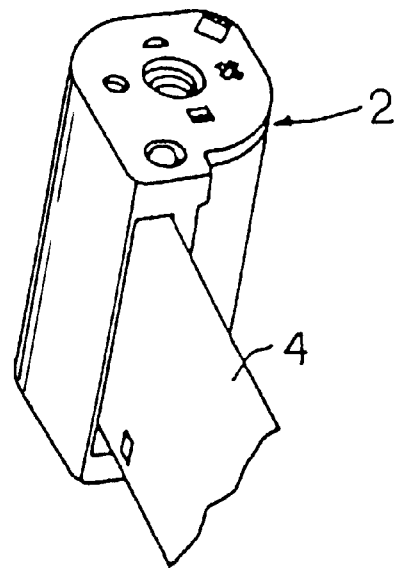
Figure 16:
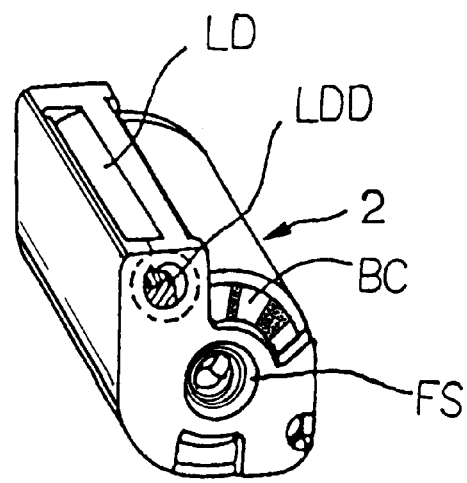

Now, a film winding procedure of the sequence B (FIG. 16, S16) will be explained referring FIG. 11 and FIG. 12. While the film winding procedure is executed, a magnetic recording of a photographing information is executed on a magnetic recording section of each film frame. First of all, the counter CMP for counting a motor pulse SMP is reset to "0" for monitoring a total driving amount of the feeding motor during a winding and then winding is started (#61). Next, in order to decide a starting position of a magnetic recording by a counting number of the motor pulse SMP based on an edge of a first perforation 4a, a leading edge of the perforation signal SPE is detected, and a value of the counter CMP of the motor pulse SMP is memorized in the counter CMP1 (#62, and #65).

If it is judges NO at the judgment of #62, that is, until the leading edge of the perforation signal SPE is detected, it is judged whether a value of the counter CMP becomes bigger than a predetermined value (b) (#64). This is for judging as a breakdown of a winding system when the winding operation can not be finished even though a motor is driven by an efficient driving amount for winding one frame (setting pulse (b) in a number of the motor pulse SMP previously). When it is judged YES at #64, it proceeds to a routine of #90 treating the breakdown. When it is judged NO at #64, it is judged whether a width of the motor pulse SMP becomes bigger than a time (a) which has been set up previously (#63). This is for judging that the feeding motor is stopped when a next trailing edge never occurs even when the predetermined time (a) has passed from a trailing edge of the motor pulse SMP (same in case of leading edge).

After the step #65, it is detected whether a difference of a value of the counter CMP and a value of the counter CMP1 becomes bigger than a predetermined value (c) (#66). It is for starting a magnetic recording when the film is wound by the predetermined pulse (c) of the motor pulse SMP from an edge of a first perforation 4a. The predetermined pulse (c) is set up previously so as to correspond to "n" in FIG. 6. When it is judged NO at the step #66, it executes the same procedure of a breakdown detection similar to #64 and #63 (#67 and #68). When it is detected YES at the judgment of #66, a winding speed is detected from a width of the motor pulse SMP just before a magnetic recording or a signal width of a first perforation signal SPE, a frequency for magnetic recording is decided, and a magnetic recording is executed (#69, #70). Then, it is judged whether a time width of the motor pulse SMP is bigger than a previously determined value (d) or not (#71), and when it is bigger than the predetermined value, it is judged that the feeding speed is too low to execute a stable magnetic recording, and it proceeds to a procedure of #90 for treating a breakdown. Since a relation of the value (a) and (d) is a>d, it does not need to judge whether a time width of the motor pulse SMP is bigger than the value (a). Next, in case that a second perforation signal SPE is detected before a completion of magnetic recording, it is judged that the magnetic recording is executed over a scope for one frame, and it proceeds to a procedure of #90 for treating a breakdown (#72).

If the second perforation signal SPE is not detected, it is judged whether a value of the counter CMP becomes bigger than the predetermined value (b) (#73) same as the step #64, and if there is no abnormality, it is detected whether a magnetic recording is finished or not (#74). Until a necessary data to be recorded is input, a loop from step #70 to step #74 is repeated, and when the magnetic recording is completed, a counted number of the motor pulse SMP at the time when the magnetic recording is completed, is memorized in the counter CMP2 (#75) in order to confirm whether all data have been recorded within a scope of magnetic recording by means of film winding amount (counted value of the motor pulse SMP) until a trailing edge of the perforation signal SPE.

Thereafter, the feeding motor 16 is braked in two steps until a film feeding is stopped. In accordance to a speed Vc of a regular speed winding, which is executed between the first brake and the second one, a time (e) is set up previously, and it is judged whether a width of the motor pulse SMP is bigger than the predetermined value (e) (#81). When it is judged as the winding speed≦Vc as a result, it continues a forward drive of the motor in a winding direction (#82). When it is judged as the winding speed>Vc, a motor brake is done (#83). As for this brake, it is a short brake or a reverse drive brake (a first brake and a brake for a regular speed winding). Furthermore, when a feeding amount until a trailing edge of the second perforation signal SPE is under a predetermined value (f) of a counted value of the motor pulse SMP, it is judged that it is over a scope of magnetic recording, and then it proceeds to a procedure of #90 for treating a breakdown (#84, #85). Further, it is judged whether a width of the motor pulse SMP is not bigger than the predetermined value (a), whether a value of the counter CMP is not bigger than the predetermined value (b) (#86, #87) same as #64 and #63, and if there is an abnormality, it proceeds to a procedure of #90 for treating a breakdown, but if there is not any abnormality, it returns to the step #81 and repeats the same procedure until a leading edge of the second perforation signal SPE is detected (#88). When the leading edge of the signal SPE is detected, the second brake is put (#89), the film feeding is stopped, and the procedure is finished. This brake is also may be a short brake or a reverse drive brake. As explained before, a read out signal of a bar code may be employed substituting for counting the motor pulse SMP (counter CMP) at #64, #67, #73, and #87 in the above sequences.

Figure 13:
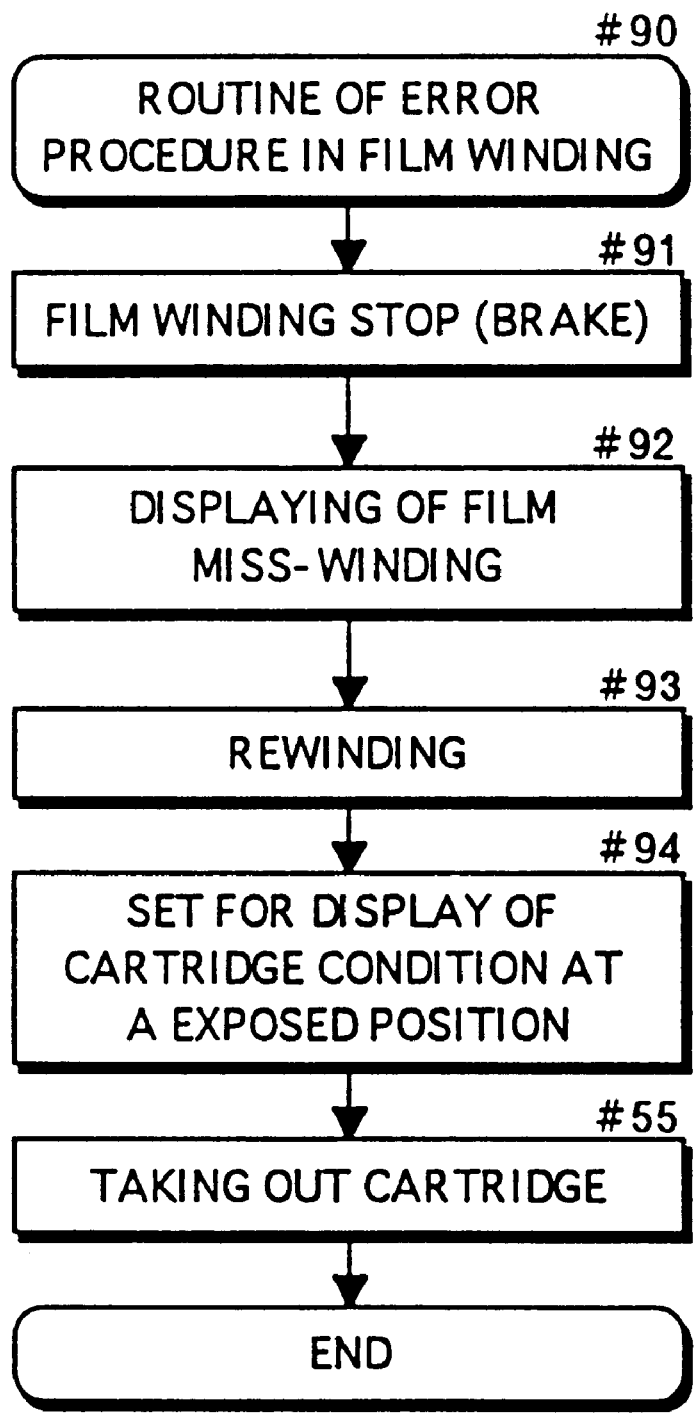
FIG. 13 is a view showing a routine for treating a trouble during a film winding up.

Now, a routine of #90 treating a breakdown procedure during a film winding will be explained referring FIG. 13. When it enters the procedure, the feeding motor is put on a brake, and the feeding is stopped (#91). Then, it indicates that the feeding is failed (#92), a rewinding operation is executed (#93). This is same as the above-mentioned rewinding operation (#53) when an initial loading is failed at a film feeding operation. Thereafter, a cartridge condition indication (stop phase) by the indicator of a cartridge (bar code plate 12) is set to an exposed position (#94). As a breakdown occurs due to a stopping motor and an abnormal recording during a film feeding, there is a possibility that a magnetic recording is poor. Accordingly, it is favorable to set it at "exposed" because there is a possibility that an exposed frame is judged as an unexposed frame on re-using it when "partially exposed" is indicated in order to enable to detect an unexposed frame by whether magnetic signal exists or not.

In addition, there is a method such that a winding sequence is executed once again by rewinding a film once to an original starting position for winding when an abnormality is detected. However, since a film feeding position is detected based on the perforation as explained above, for example, if the film feeding is stopped at edge portion of the perforation accidentally in an abnormal stopping, it is likely to produce a false signal due to movement of the edge of the perforation because the film is swayed forward and backward with a slight vibration at resuming an operation, and there is a high possibility to misunderstand an accurate film feeding position. Accordingly, it is more favorable to set the cartridge condition indicator at "exposed" after rewinding the film, not executing a false sequence again.

In the above embodiment, it is explained that a film cartridge is employed for magnetic recording, but a film cartridge, where information is input optically, is also able to be employed to the present invention. Further, in addition to a bar code, an indicator for indicating a film condition in a film cartridge may be any optional method such as a symbol which is read out visually as ○ and ×.

Moreover, although a camera is taken up in the above embodiment, an apparatus which develop a photographed film at a photo-finisher, a film scanner which reads out an image on a processed film, and the like may be adopted as an embodiment. In the above-mentioned development apparatus, the film is fed when an indicator shows "exposed" or "partially exposed", and the indicator is reset to an ordinal state ("exposed" or "partially exposed") or reset to "exposed" when a trouble occurs on a film feeding. In the above-mentioned film scanner, the film is fed when the indicator shows that the film has been developed, and the indicator is reset to an original state (developed) when a trouble occurs on a film feeding.

Now, a second embodiment of the present invention will be explained referring to the drawings.

Figure 14:
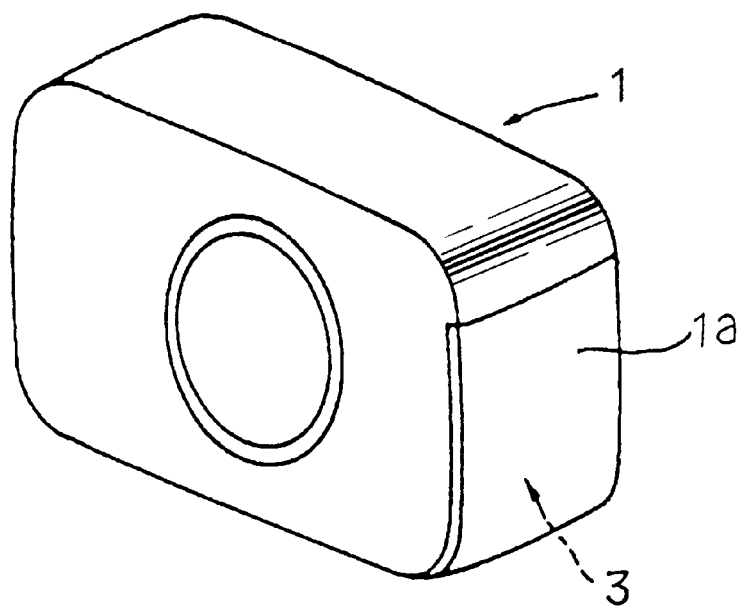
FIG. 14 is a perspective view showing an appearance of a camera according to the second embodiment of the present invention.
Figure 15:
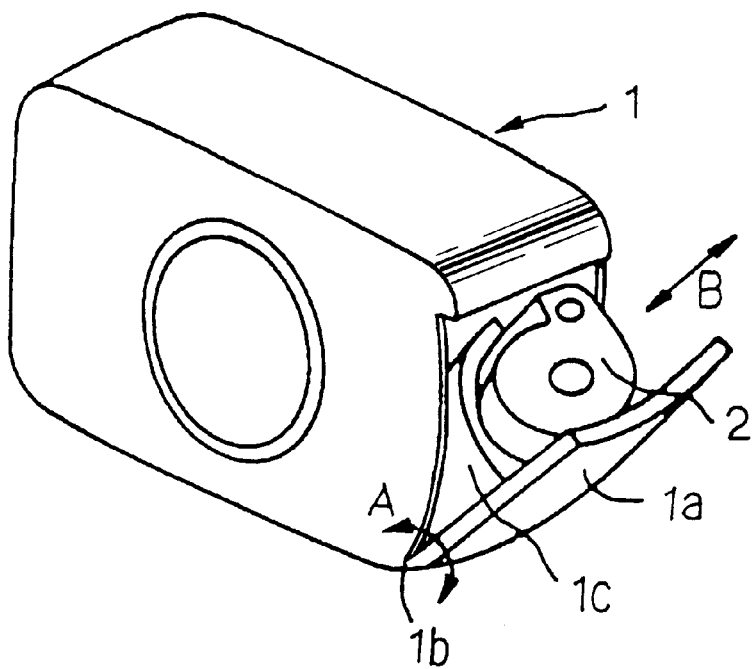
FIG. 15 is a perspective view showing a state that the cartridge chamber is ejected in the FIG. 14, FIGS. 16(a) and 16(b) are perspective views of a film cartridge which is used in the embodiment.

FIG. 14 and FIG. 15 show an appearance of an embodied example of the present invention, employing the present invention for a camera. Here, an interchangeable lens, shutter release button, and other set up devices, etc., which have no direct relation with the present invention, are omitted. In FIG. 14, on one side of camera body 1, a cover 1a which covers a cartridge chamber 3 is equipped. As shown in FIG. 15, the cover 1a is supported at its lower part so as to be rotatable by a hinge 1b extending front and rearward direction of the camera, and the cover 1a is biased to a direction that the cartridge chamber 3 is opened. The cartridge chamber 3 is opened (ejected) by turning of the cover 1a along to an arrow A with a pressing force and it is closed by turning of the cover 1a against the pressing force.

FIG. 14 shows a state that the cartridge chamber 3 is closed, and FIG. 15 shows a state that it is opened (ejecting state). As shown in FIG. 15, a cartridge holder 1c is attached in the cartridge chamber 3, and the holder 1c holds a surrounding plane of a film cartridge 2. The cartridge 2 is put in and out by moving along an arrow B.

FIGS. 16(a) and 16(b) show the cartridge 2 to be used in the camera of the present embodiment, and FIG. 16(a) shows the upper plane of the cartridge 2 and FIG. 16(b) shows the bottom plane of the same. Normally, a film 4 is contained in the cartridge 2 completely, and its exit part is shut with a shading lid LD, and the shading lid LD is opened by actuating a shading lid opening member LDD disposed inside of an aperture, which is formed the bottom plane of the cartridge 2.

The film 4 is fed out from the cartridge 2 by making a rotation shaft FS of the cartridge 2 rotate in a state that the shading lid LD is opened, and it is rewound into the cartridge 2 by making the rotation shaft FS rotate in a reverse direction. Further, as shown in FIG. 16(b), a bar code plate BC in a disk shape having a bar code is arranged as to be rotatable unitedly with the rotation shaft FS, consequently, it is able to show information about a film in the cartridge 2.

Figure 17:
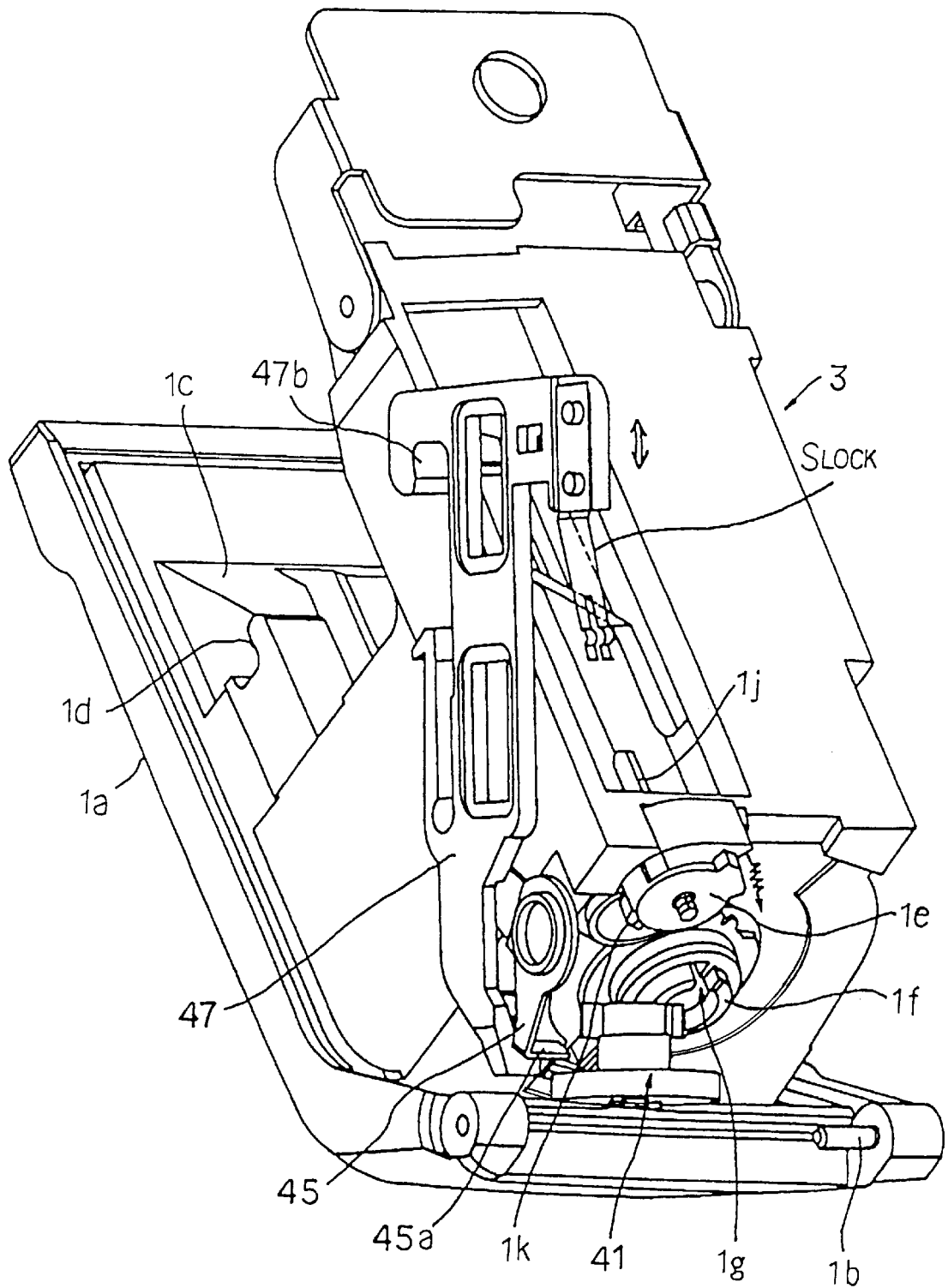
FIG. 17 is a perspective view showing an inside of the cartridge chamber of the embodiment.
Figure 18:
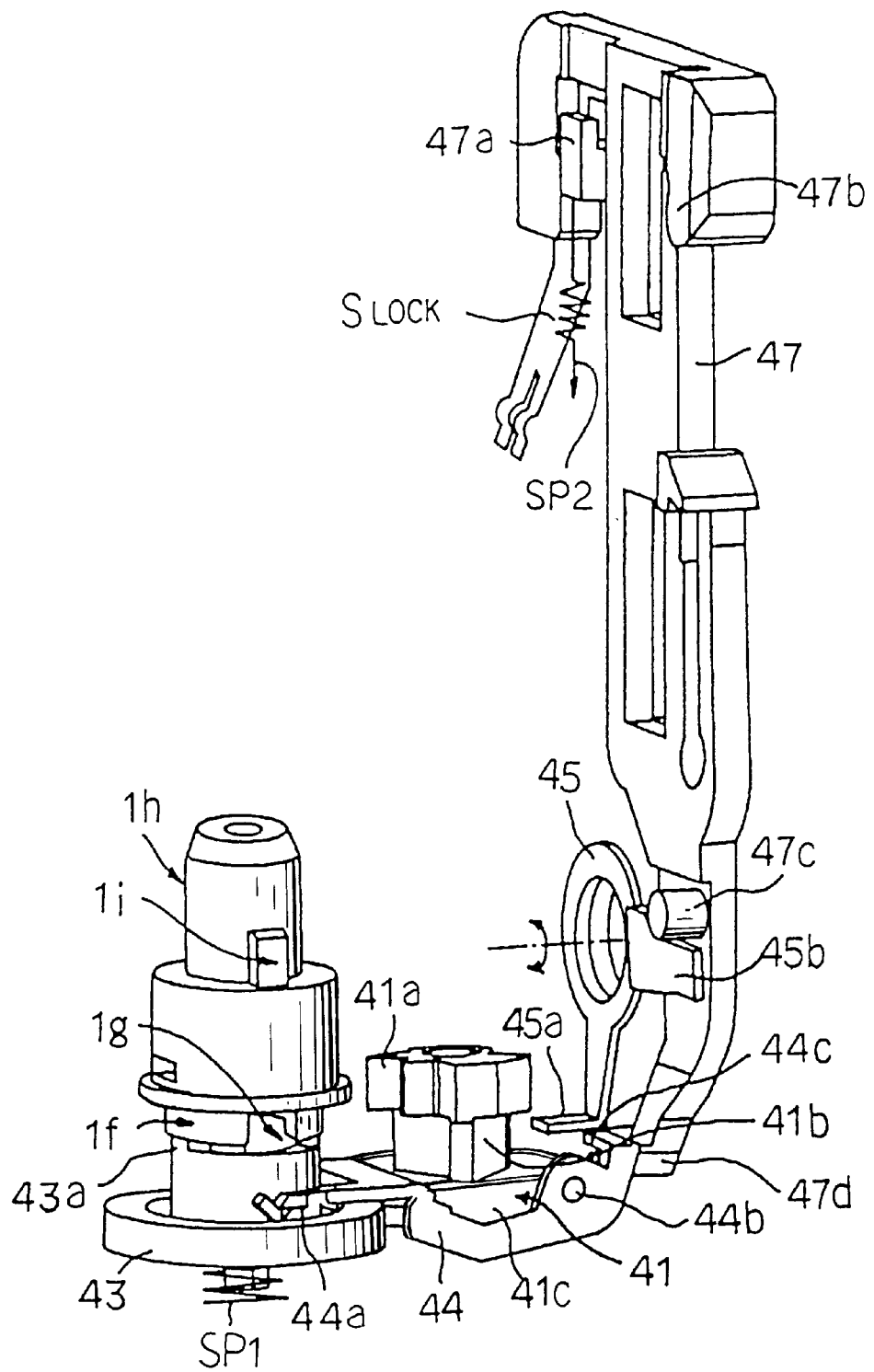
FIG. 18 is a second perspective view showing an inside of the cartridge chamber of the embodiment.
Figure 19:
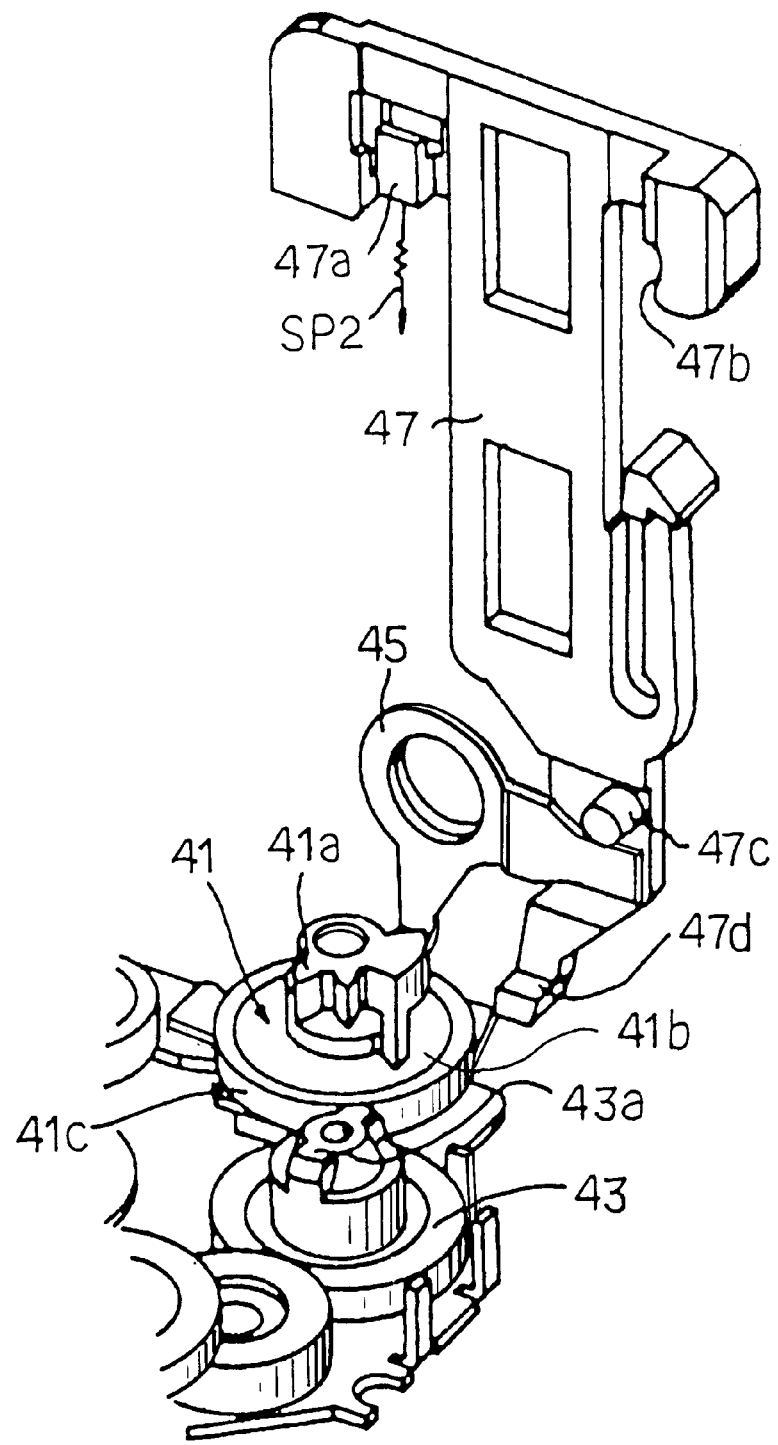
FIG. 19 is a third perspective view showing an inside of the cartridge chamber of the embodiment.

Now, an inside structure of the cartridge chamber 3 will be explained in detail based on FIG. 17, FIG. 18, and FIG. 19. FIG. 17 is a perspective backside view showing a state that only member forming the cartridge chamber 3 is taken out from the camera body 1 and the cartridge chamber 3 is opened. FIG. 18 is a perspective front side view showing the cartridge chamber 3 in a state that a cartridge holder 1c is also removed from the member forming the cartridge chamber 3. FIG. 19 shows a side and somewhat front view of the same state as FIG. 18.

In FIG. 17, FIG. 18 and FIG. 19, a cam gear 41 for driving a cartridge 2 is disposed at a bottom of the cartridge chamber 3, wherein the cam gear 41 is supported so as to be rotatable on a structural unit of the camera body 1 (the unit is removed in FIG. 17 and FIG. 18). The cam gear 41 is constructed in three pieces, and the bottom piece 41c is a gear for inputting a driving force to the cam gear 41, the middle piece 41b is a cam for allowing an ejection of the cartridge camber 3, and the upper piece 41a is a gear of which tooth are lacked partially in circumference (hereinafter refers to a partial miss-tooth gear) for opening and shuttering the above-mentioned shading lid LD. Each operation will be explained later.

A fork member 43 is supported so as to be rotatable by the unit of the camera body 1 as shown in FIG. 18 and FIG. 19 although it is omitted in FIG. 17. The upper step of the fork member 43 is composed of a shaft part in the center and a pair of wings 43a, which is projecting out for a radius direction from the shaft. The fork member 43 is arranged so as to be movable vertically, that is, to be movable along to the rotation shaft, and it is biased upwardly by a first spring member SP1 as shown in FIG. 18.

A drive edge 44a of a withdrawal member 44 for withdrawing of the fork member 43 is attached to a upper surface of the lower step of the fork member 43. The withdrawal member 44 is rotatable around a horizontal shaft 44b, and it rotates due to an upward driving of a receiving edge 44c, and then it pushes down the fork member 43 with the drive edge 44a against a pressing force of the first spring SP1.

On the other hand, at a bottom of the holder 1c, a fork receiving member 1f is disposed as to be rotatable as shown in FIG. 17. At the fork receiving member 1f, a pair of notches 1g is formed, and when the cartridge chamber 3 is closed, the above-mentioned wing 43a formed on the fork member 43 and the notch 1g are meshed, then the receiving member 1f is also able to rotate in accordance to a rotation of the fork member 43. On upper portion of the receiving member 1f, a projection 1h is formed as shown in FIG. 18, further a key 1i is formed projecting out to a radius direction from a circumference of the projection 1h. The key 1i has a shape that fits to a key groove (not shown) formed on the rotation shaft SF of the cartridge 2, and it is for executing a feeding out and rewinding drive of the film 4.

Further, at a bottom of the holder 1c, a shading lid drive member 1e is arranged so as to be rotatable. The shading lid drive member 1e has a partial miss-tooth gear 1k, and when the cartridge chamber 3 is closed, it is able to mesh with the above-mentioned partial miss-tooth gear 41a at the upper piece of the cam gear 41. Here, as both gears are partial miss-tooth gears, they are meshed at only predetermined phase of rotation. Moreover, a shading lid engaging member 1j is formed on an upper part of the shading lid drive member 1e. This shading lid engaging member 1j drives the shading lid LD by mashing with a shading lid opening member LDD of the film cartridge 2.

Near the above-mentioned each members, a lock member 47 is disposed so as to be movable vertically along an inside of a back plane of the camera body 1. The lock member 47 is forced to be pushed downward by a second spring SP2 hung from an arm 47a. Further, at the lock member 47, an engagement member 47b, which extends downward, is formed and it is able to engage with the engagement member 1d formed on the holder 1c. When both engagement members 47b and 1d are engaged, the cartridge chamber 3 is kept in a closed state. Further, when both engagement members 47b and 1d are detached, the cartridge chamber 3 is able to be opened (ejection).

A pin 47c is arranged at a lower part of the above-mentioned lock member 47. The lower edge portion of the lock member 47 is bent and it forms an arm 47d. Further, an engaging member 45 is also arranged so as to be rotatable near the lock member 47. At the engaging member 45, a first split 45a, which is able to engage with the above-mentioned cam 41b at the middle piece of the cam gear 41, and a second split 45b, which is able to engage with the above-mentioned pin 47c of the lock member 47 from downward, are formed. The cam gear 41, the engaging member 45, and the lock member 47 are arranged so that the engaging member 45 would rotate to a clockwise direction due to an engagement of the cam gear 41b and the first split 45a, and then the lock member 47 would be raised up against a pressing force of the second spring SP2 due to an engagement of the second split 45b and the pin 47c.

Further, an arm 47d of the lock member 47 is located so as to engage with the receiving edge 44c of the withdrawal member 44 form its downward, and it drives the receiving edge 44c upward when the lock member 47 is raised up. Consequently, the withdrawal member 44 rotates to a counterclockwise direction and then the drive edge 44a is able to push down the fork member 43.

Figure 20:
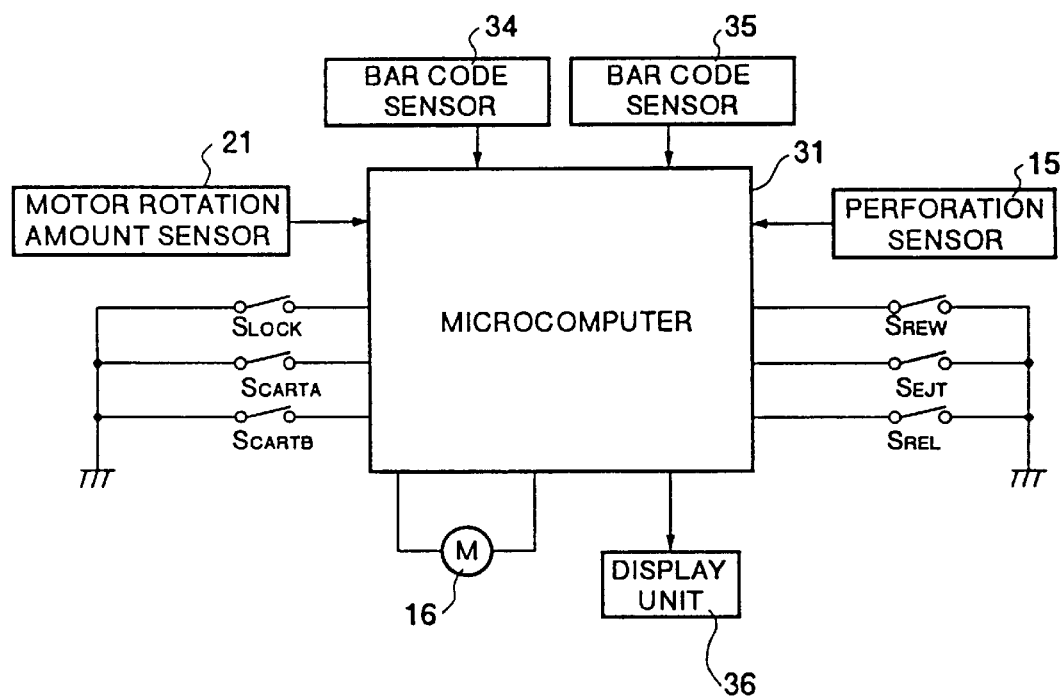
FIG. 20 is a schematic block diagram of a circuit of the embodiment.

Now, switches and the like will be explained referring to FIG. 20. A camera of the present embodiment is controlled its operations by a microcomputer. One terminal of following switches is connected with the microcomputer, and the other terminal is connected to a ground.

SLOCK—a switch for detecting a position of the lock member 47,

SCARTA—a switch for detecting that the cam gear 41 is in a predetermined rotation phase, SCARTB—a switch for detecting that the cam gear 41 is in the other predetermined rotation phase, SREW—a switch for commanding halfway rewinding in which a film is forcibly rewound in the middle of in use, SEJT—a switch for commanding an ejection of the cartridge chamber 3, SREL—a switch for actuating a shutter release, Here, the SCARTA and the SCARTB may be substituted for only one switch. In this case, two phases are to be detected such as turning from switch's OFF to ON and turning ON to OFF.

Moreover, a pair of sensors is connected with the microcomputer, and it is for reading out a bar code on the bar code plate BC disposed on the film cartridge 2. These bar code sensors 34 and 35 are arranged so as to be faced to different rotation phase positions of the bar code plate BC, and bar code is read out based on an output from the both bar code sensors. Here, it is possible to read out the bar code based on output from only one sensor.

Further, a perforation sensor 15 is a sensor for detecting a perforation of the film 4. Also, a motor 16 for feeding out, winding and rewinding a film, and for rotating various kinds of cams and gears, and a motor rotation amount sensor 21, which detects the amount of rotation of the motor 16, are connected with the microcomputer. The motor 16 is controlled its rotation by the microcomputer and at the same time, its driving force is transmitted selectively to various mechanism by a planet gear mechanism (not shown). Here, it is able to arrange a plural motors and motor rotation amount sensors which detects an amount of rotation of the each motors, and drives various mechanism selectively by driving a motor selectively out of the plural motors by the microcomputer.

In addition to the above mechanism, circuits and structure for controlling a photographing preparation operation (auto focusing, light measuring, etc.) of a camera and controlling a photographing operation are connected with the microcomputer, but they are omitted here as they are not related with a main purpose of the present invention.

Now, operations of a camera according to the embodiment will be explained referring to FIG. 17, FIG. 18, FIG. 19, and FIG. 20 and newly, referring to FIG. 21, FIG. 22, and FIG. 23.

Figure 21:
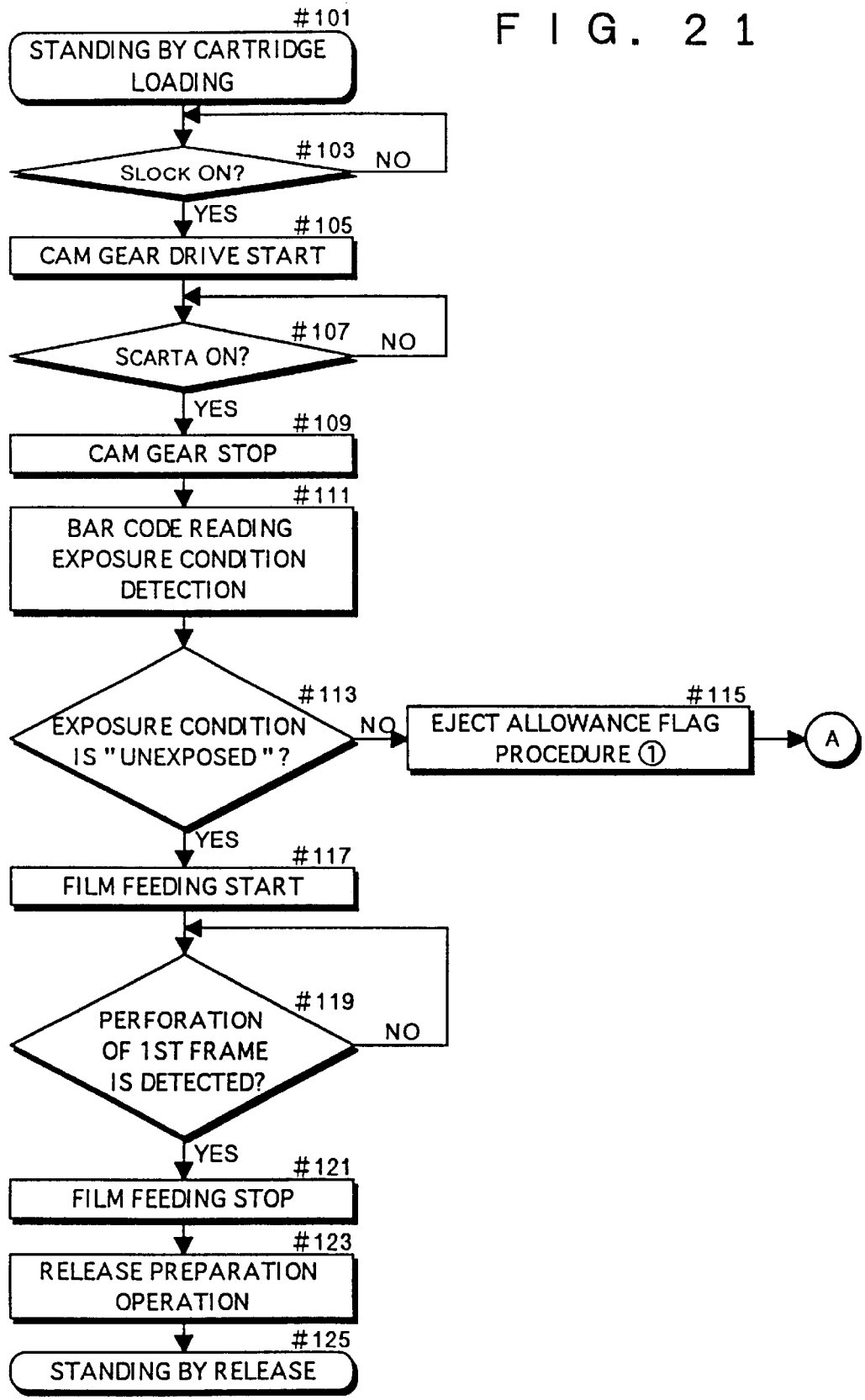
FIG. 21 is the first flowchart showing operations of the embodiment.

FIG. 21 shows operation from loading a film cartridge 2 on the camera before feeding a film to a first film frame. First of all, in order to load the film cartridge 2 on the camera, a cartridge chamber 3 is ejected by operating the switch SEJT. With the operation of the switch SEJT, a driving force of the motor 16 is transmitted to the cam gear 41, and the cam gear 41 rotates. From the rotation, the cam 41b at the middle piece of the cam gear 41 engages with the first split 45a of the engaging member 45 and pushes it. Then, the engaging member 45 rotates to a counterclockwise direction and its second split 45b pushes up the pin 47c. Consequently, the lock member 47 is pulled up against a pressing force of the second spring SP2. With this movement, an engagement of engaging member 47b and engaging member 1d is unlocked, the cover 1a turns by pressing force of the spring, and then the cartridge chamber 3 is opened. Here, it is in a state that the microcomputer of the camera is standing by loading the film cartridge 2 as shown at a step #101 in FIG. 21.

As shown in FIG. 15, when the film cartridge 2 is loaded on the holder 1c and the cover 1a is closed by turning it, the lock member 47 is pushed up due to jostling of the engaging member 47b and 1d, which have a taper shape at the attaching plane, and the both engagement members are engaged by an effect of the second spring SP2.

At this point, as an arm 47d of the lock member 47 is withdrawn downward, it is canceled that the fork member 43 is being pushed down by the withdrawal member 44, and the fork member 43 is pushed up by a pressing force of the first spring SP1.

On the other hand, as shown in FIG. 17, the receiving member 1f and the shading lid drive member 1e, which have been moved upward with the holder 1c, moves downward. Consequently, the receiving member 1f is put in an upper portion of the fork member 43 as shown in FIG. 18. Here, if a position of the notch 1g at a side of the receiving member 1f and a position of a wing 43a at the side of the fork member 43 are fit, the both members are put in completely. In case that the position is not fit, the fork member 43 is withdrawn downward a little against a pressing force of the first spring SP1, and thereafter when the position of the both members are fit by rotation of the fork member 43, the receiving member 1f and the fork member 43 are put in completely. Further, also the shading lid drive member 1e is shifted to a position where the partial miss-tooth gear 1k is able to mesh with the partial miss-tooth gear 41a formed on the cam gear 41.

Connected with these operations, the above-mentioned switch SLOCK is turned on. When this is detected at a step #103 in FIG. 21, it proceeds to a step #105 and rotates the cam gear 41 by a driving force of the motor 16. Caused by this rotation, the partial miss-tooth gear 41a of the cam gear 41 drives the partial miss-tooth gear 1k of the shading lid drive member 1e, and then the engaging member 1j rotates. As a result, the engaging member 1j rotates the shading lid member LDD of the film cartridge 2, and the shading lid LD is opened. The partial miss-tooth gear 41a holds the partial miss-tooth gear 1k at the position, and the shading lid LD is kept being opened. When the cam gear 41 rotates to a position where the shading lid LD is opened completely, the above-mentioned switch SCARTA is turned on, and a drive of the cam gear 41 is stopped (steps #107~#109).

Then, the driving force of the motor 16 is transferred to the fork member 43, and the fork member 43 and the receiving member 1f rotate. The projection 1h formed on upper portion of the receiving member 1f fits into the rotation shaft FS of the film cartridge 2, and the key 1i drives a key grove formed at the side of the film cartridge 2 and rotates the rotation shaft FS. Consequently, the bar code plate BC rotates, and a bar code on the bar code plate BC is read out by the above-mentioned bar code sensors 34 and 35 (step #111). What is read out here is an information such as a film sensitiveness, an amount of frame capable photographing, and condition of the film ("Exposed", "Partially Exposed", "Unexposed", or "Processed").

If it is detected that the film has been exposed from a read out information (#113, NO), it proceeds to a procedure for taking out the film cartridge 2 after executing setting up an eject allowance flag not to employ the film (#115), and the details will be explained later.

When it is detected the film is not exposed (#113, YES), it proceeds to a step #117 and turns the fork member 43 to a predetermined direction, and feeds out the film from the film cartridge 2 until a perforation of the first film frame is detected (#119). When it is detected that a perforation of the first frame by the perforation sensor 15, the rotation of the fork member 43 is stopped (#121), and the film feeding is finished. Thereafter, a camera is set so as to be able to execute a shutter release (#123), and then it stands by a shutter release operation (#125).

Figure 22:
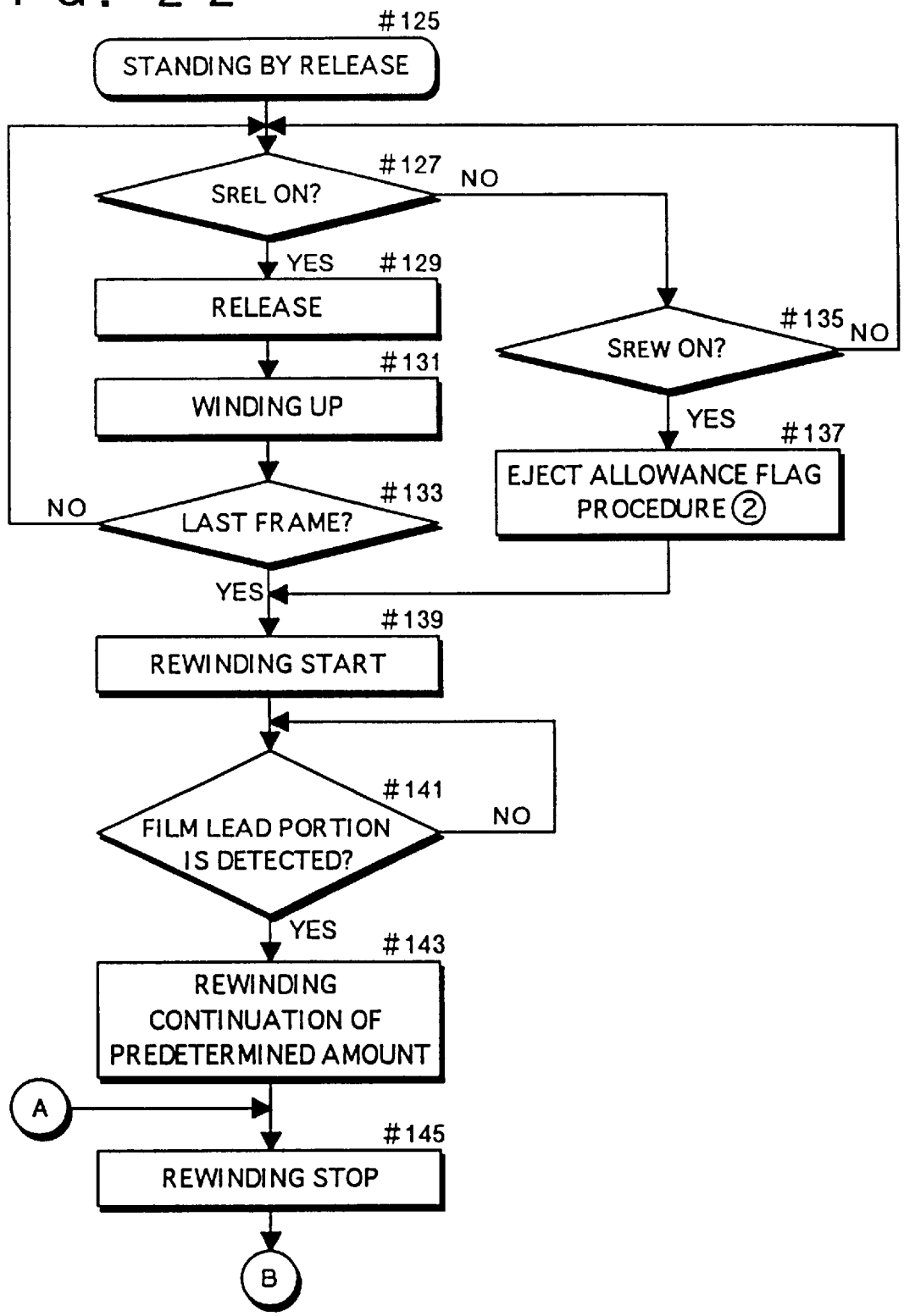
FIG. 22 is the second flowchart showing operations of the embodiment.

FIG. 22 shows operations until the film is automatically rewound after a photographing operation is executed to the last frame, or until the film is forcibly rewound in the mid-roll of the film by the switch SREW. In the FIG. 22, in a state of standing by a shutter release (#125), it waits until the above-mentioned switch SREL is operated and shutter release operation is executed (#127) or until the above-mentioned switch SREW is operated and a halfway rewinding is commanded (#135). Then, when a shutter release operation is executed (#127, YES), it proceeds to a step #129, a photographing operation including a shutter release operation is executed (details are omitted here). Further, in accordance to a completion of the photographing, a film frame is rewound by one frame at a step #131, and it is detected that the lastly photographed frame is the last frame of the film or not. This detection is executed by comparing number of frame capable of photographing, which is detected at the step #111, with the number of frame photographed. When the detected result is that the photographed frame is not the last frame of the film (#133, NO), it returns to the step #127, and it stands by a release operation again.

On the other hand, it is the last frame of the film (#133, YES), it proceeds to a step #139, the fork member 43 is rotated by the motor 16, and it executes a film rewinding. When it is detected that the switch SREW is on at the above-mentioned step #135, that is, a halfway rewinding is commanded, it proceeds to a step #137 and sets up an eject allowance flag, and proceeds to a step #139 so as to rewind the film.

When it is detected that a lead portion of a film 4 has passed by the perforation sensor 15, which detects a perforation (#141, YES) and the film is rewound remaining its lead portion, it proceeds to a step #143 so as to continue the rewinding of the remained lead portion of the film by a predetermined amount needed for drawing into the film cartridge 2. Here, the rewinding drive is executed monitoring the amount of rotation of the motor 16 by the motor rotation amount sensor 21. Here, the continual operation may be executed by driving the rewinding for a predetermined time with a timer not by monitoring the rotation amount.

Thereafter, it proceeds to a step #145 and the bar code plate BC is rotated to a position where the above-mentioned bar code shows that a photographing is completed ("Exposed") (when the last frame is detected at #133), or where it shows that a halfway rewinding is executed ("Partially Exposed") (when the switch SREW is ON at #135). This operation is executed by making the fork member 43 rotate, detecting a condition of the bar code by the above-mentioned bar code sensors 34 and 35. Here, even when the film, which has been loaded at the step #113, is a used film, it proceeds to the step #145 and returns the position of the bar code plate BC to an original position. Thereafter, it proceeds to a procedure shown in FIG. 23.

Figure 23:
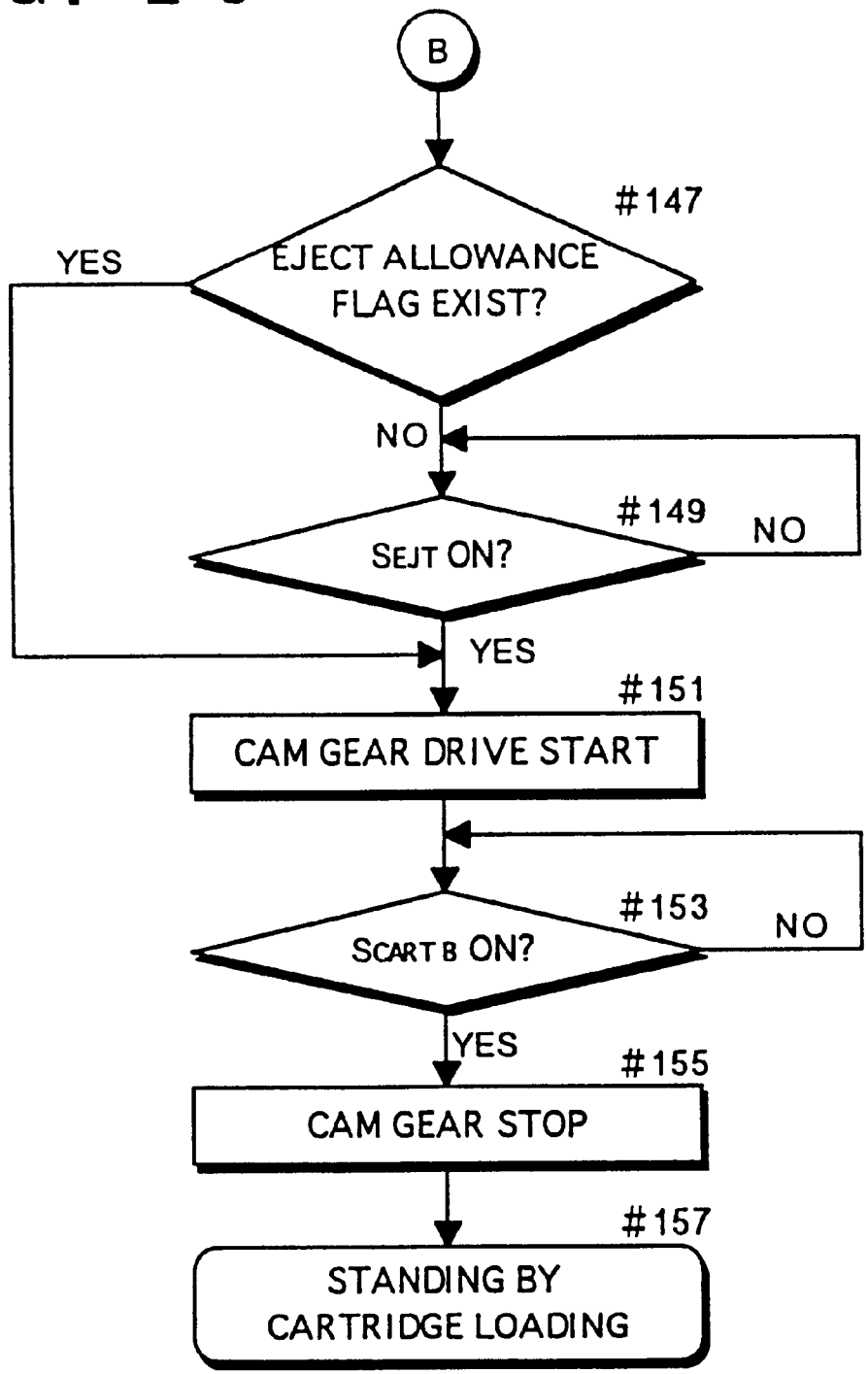
FIG. 23 is the third flowchart showing operations of the embodiment.

FIG. 23 shows a procedure after film rewinding is completed. First of all, it is detected whether an eject allowance flag is set up or not at a step #147. As explained before, the eject allowance flag has been set up at the step #115 and #137. That is, it is detected as YES at the detection when the loaded film is a used one and a halfway rewinding has been commanded, however, it is detected as NO when the film has been rewound after a photographing is completed to the end frame of the film.

When it is judged as YES, it proceeds to a step #151 and enters to an ejecting operation, and when it is judged as NO, it proceeds to the step #51 after waiting until the switch SEJT for commanding an ejection is operated. That is, when the loaded film is a used one and when a halfway rewinding has been commanded, an ejection is executed immediately, but, when the photographing has been done completely to the end frame, it waits for an ejection to be commended by a user intentionally.

At the step #151, the cam gear 41 is rotated by the motor 16, and first of all, it is unlocked that the partial miss-tooth gear 1k of the shading lid drive member 1e is held by the partial miss-tooth gear 41a, and the shading lid LD of a film cartridge 2 is closed by a force of a spring (not shown). Then, the first split 45a of the engaging member 45 is driven by the middle step cam 41b of the cam gear 41, the engaging member 45 rotates to a counterclockwise direction, and the second split 45b pushes up the pin 47c. Then, the arm 47d of the lock member 47 pushes up the receiving edge 44c of the withdrawal member 44. Consequently, the drive edge 44a pushes down the fork member 43. As this movement is for taking off the receiving member 1f from the fork member 43 smoothly because a movement direction of the receiving member 1f meshed with the fork member 43 is a rotation direction around the hinge 1b (direction inclined for a rotation shaft of the fork member 43).

As the lock member 47 risen up more, an engagement of the engaging member 47b and the engaging member 1d is unlocked, the cover 1a rotates by a pressing force of a spring, the cartridge chamber 3 is opened, and the film cartridge 2 is able to be taken out. When it is detected that the cam gear 41 is in a predetermined rotation phase by the switch SCARTB, the drive of the cam gear 41 by the motor 16 is stopped (#153~#155). When an ejecting operation is completed, an ejection allowance flag is reset. Thereafter, it stands by a next loading of a film cartridge (#157). That is, it returns to the same condition as the step #101.

In case that an ejection allowance flag has not set up (#147, NO), and when the switch SEJT is not operated, it is able to execute a closing operation of the shading lid LD. That is, from the step #147 to the step #149, it is able to execute only following operations such as rotating the cam gear 41, unlocking that the partial miss-tooth gear 1k of the drive member 1e is held by the partial miss-tooth gear 41a, and closing the shading lid LD of the cartridge 2 by a pressing force of spring. However, in the present embodiment, the shading lid LD is maintained in a opened state until that the switch SEJT is operated unlike the above.

Figure 24:
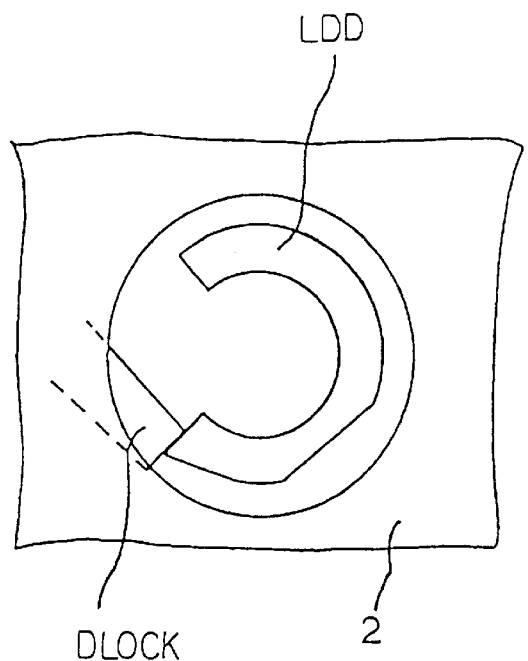
FIG. 24 is a partial enlarged view of the film cartridge which is used in the embodiment.
Figure 25:
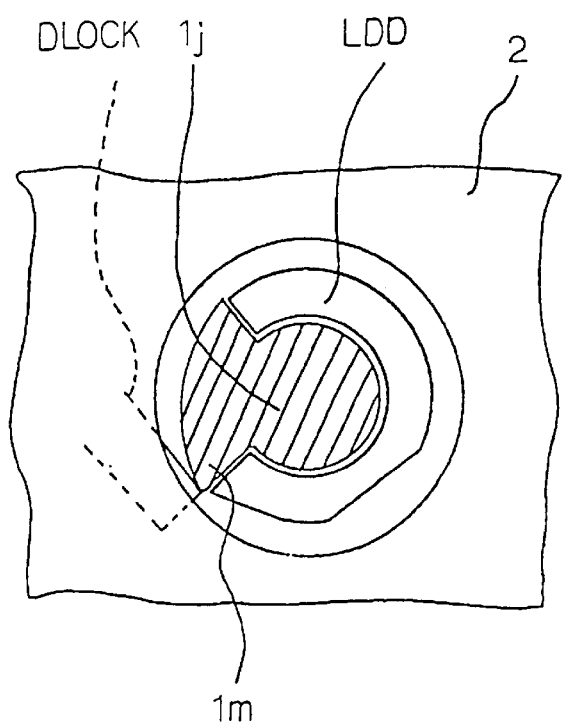
FIG. 25 is a partial enlarged view showing a usage condition of the film cartridge of the embodiment.
Figure 26:
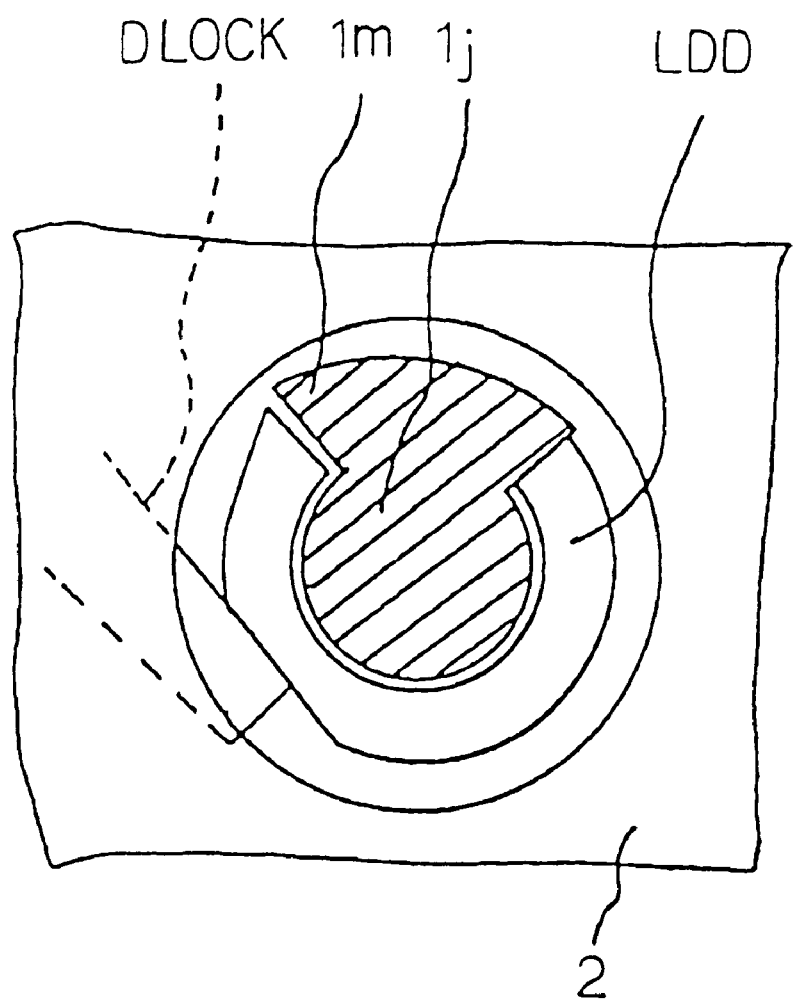
FIG. 26 is a partial enlarged view showing a usage condition of the film cartridge of the embodiment.

That is due to following reasons. FIG. 24, FIG. 25, and FIG. 26 show an enlarged shading lid opening member LDD. FIG. 24 shows a state that the shading lid LD is closed, FIG. 25 shows a state that the shading lid engaging member 1j is engaged with the shading lid opening member LDD, FIG. 26 shows a state that the shading lid engaging member 1j turns the shading lid opening member LDD to a clockwise direction and the shading lid LD is opened.

In the respective figures, a lock claw DLOCK prevents the turning of the shading lid LD by engaging with the shading lid opening member LDD, and it is a bendable lock claw for holding the shading lid LD in a closed state. A projection 1m is formed on the engaging member 1j as shown in FIG. 25, and a slope at the tip of the projection 1m pushes and bends the lock claw DLOCK to a clockwise direction as shown in the figure when the engaging member 1j is engaged with the shading lid opening member LDD, and unlocked the lock claw DLOCK. Thereafter, when the shading lid opening member LDD is turned to a clockwise direction with the engaging member 1j, the lock claw DLOCK is recovered with its elastic character as shown in FIG. 26, and it is in a state touching a part of a shape that a surrounding plane of the shading lid opening member LDD is cut partially.

Accordingly, when it is a state that the film cartridge 2 is loaded in a camera, the engaging member 1j is engaged with the shading lid opening member LDD, further the shading lid LD is closed (state in FIG. 25), the lock claw DLOCK is transformed considerably elastically. If this state lasts for a long time, the lock claw DLOCK becomes fatigue and there is possibility that the lock claw DLOCK is not able to recover even if the shading lid LD is closed later. In the embodiment, it is possible to prevent a fatigue of the lock claw DLOCK as shading lid LD is kept to be opened in a state of FIG. 26 when an ejecting operation is not executed (#149) avoiding that a state such as FIG. 25 lasts for a long time.

As explained the above, according to the embodiment, it does not execute an automatic ejecting operation when the film has been used to the end and then it has been rewound into the film cartridge automatically, on the other hand, when the film has been rewound from a halfway, an ejecting operation is executed automatically after a rewinding. The reason is that a user tends to want to take out a cartridge in case that a halfway rewinding is executed (user tends to want to exchange with other kind of film, develop the film soon, and the like), and in case that the film is rewound automatically after photographing to the end, the film is not rewound by the user intentionally and the user does not always want to take out the cartridge. That is, the user can take out the cartridge immediately with his intention in case of a halfway rewinding, and an ejection after using a film to the end depends on the user's intention. In particular, there may be a case that no film to be exchanged with is not prepared when the film is rewound ignoring the user's intention, and photographing is finished as it is. In that case, it is estimated that there are many user who leave the cartridge in a camera as it is.

Further, according to the embodiment, a means for ejecting a film cartridge is installed, it is able to execute an ejection of a film cartridge optionally after using the film to the end and rewinding it.

Furthermore, according to the embodiment, an automatic ejection is executed even when it is detected that the loaded film is a used one. This is to respond to the user's intention who are loading a cartridge on a camera for photographing, and it is able to urge him to loading an available cartridge by ejecting the used unavailable cartridge immediately. Here, the present invention may be constructed such that the user is authorized to decide whether an ejection is to be executed or not, not ejecting a film automatically even if the film is a used one. That is, it may be constructed so as to display (warn) that the loaded film cartridge is a used one, and to execute an ejecting operation with an operation of the switch SEJT.

Furthermore, according to the embodiment, the cartridge chamber is ejected and it is favorable because the cartridge does not tend to be dropped at an automatic ejection, but, needless to say, even a structure that only a cartridge is ejected may be employed to the present invention.

Furthermore, according to the embodiment, the present invention has a structure that a film is rewound automatically after the last frame of the film is photographed, but it may be substituted by a structure that the film is rewound with a switch which commands an ejecting operation. In this case, an ejection of a film cartridge may executed automatically in accordance to a completion of a rewinding.

Moreover, although the present invention is applied to a camera in the above-mentioned embodiment, it may employed to various kinds of apparatus not being limited within a camera. For instance, it may be employed to an apparatus for reproducing an image of a film onto a display loading a developed film, an apparatus for transferring an image of a film to a optical disk and the like and editing it, by means of loading a developed film, and it is employed to an apparatus as long as it uses a film loaded in a cartridge by drawing out and rewound it thereafter.

What is claimed is:

1. An apparatus using a film cartridge having an indicator which indicates an exposing condition of a film contained inside of the film cartridge, the apparatus comprising:

a reader for reading the indicator showing the exposure condition of the film cartridge loaded in the apparatus;

a feeder for feeding a lead portion of the film from the film cartridge and conveying a frame to be firstly exposed at a position for exposure;

a detector for detecting that an abnormality occurs in the feeding such that the frame to be firstly exposed fails to reach the position for exposure; and a controller for controlling the film to be rewound and said indicator to be reset to an original indication state of said exposure condition when said abnormality is detected by said detector during the feeding of said lead portion of the film from the film cartridge and conveying of the frame to be firstly exposed to said position for exposure.

2. An apparatus using a film cartridge having an indicator which indicates an exposing condition of a film contained inside of the film cartridge, the apparatus comprising:

a reader for reading the indicator showing the exposure condition of the film cartridge loaded in the apparatus;

a feeder for thrusting a lead portion of the film from the film cartridge;

a detector for detecting that an abnormality occurs in a film advancement executed by the feeder; and a controller for controlling the film during a film feeding operation, whereby the film is rewound when said abnormality is detected by said detector and said indicator is reset to an original indication state of said exposure condition, said original indication state being determined at a time of the film cartridge loading based on the detection by said reader, said detector including a first sensor for detecting rotation of said driving motor of said feeder, and a second sensor for detecting a perforation adjacent said lead portion of the film on a film feeding path.

3. The apparatus as claimed in claim 2, wherein said detector detects said abnormality based on that a detection signal output from said first sensor is improper.

4. The apparatus as claimed in claim 2, wherein said detector detects said abnormality based on that the film is not detected by said second sensor regardless that a detection signal is output from said first sensor normally and said film feeding operation is executed by a predetermined amount.

5. An apparatus using a film cartridge having an indicator which indicates an exposing condition of a film contained inside of the film cartridge, the apparatus comprising:

a reader for reading the indicator showing the exposure condition of the film cartridge loaded in the apparatus;

a feeder for thrusting a lead portion of the film from the film cartridge;

a detector for detecting that an abnormality occurs in a film advancement executed by the feeder;

a controller for controlling the film during a film feeding operation, whereby the film is rewound when said abnormality is detected by said detector and said indicator is reset to an original indication state of said exposure condition, said original indication state being determined at a time of the film cartridge loading based on the detection by said reader, said detector including a first sensor for detecting a rotation of a film winding spool of the film cartridge and a second sensor for detecting a film on a film feeding path.

6. The apparatus as claimed in claim 5, wherein the detector detects said abnormality based on that a detection signal detected from said first sensor is improper.

7. The apparatus as claimed in claim 5, wherein said detector detects said abnormality based on that the film is not detected by said second sensor regardless that a detection signal is output from said first sensor properly and said film feeding operation is executed by a predetermined amount.

8. A camera using a film cartridge having an indicator which indicates an exposing condition of a film contained inside of the film cartridge, the camera comprising:

a reader for reading the indicator showing the exposure condition of the film cartridge loaded in the apparatus;

a feeder for feeding a lead portion of the film from the film cartridge;

a detector for detecting that an abnormality occurs in a film advancement executed by the feeder such that a frame to be firstly exposed fails to reach the position for exposure; and a controller for controlling the film during a film feeding operation, whereby the film is rewound when said abnormality is detected by said detector and said indicator is reset to an original indication state of said exposure condition, said original indication state being determined at a time of the film cartridge loading based on the detection by said reader.

9. An apparatus using a film cartridge having an indicator which indicates an exposing condition of a film contained inside of the film cartridge, the apparatus comprising:

a feeder for thrusting a lead portion of the film from the film cartridge loaded in the apparatus and conveying the film to a predetermined position;

a controller for controlling said thrusting of the lead portion of the film from the film cartridge and conveying the film to said predetermined position, and subsequent advancing of the film from said predetermined position at every one frame; and a detector for detecting an abnormality in said subsequent advancing of the film from said predetermined position, said controller controlling the film to be rewound and said indicator to set a state that the film is exposed when said abnormality is detected during said subsequent frame by frame advancement of the film from said predetermined position.

10. An apparatus using a film cartridge having an indicator which indicates an exposing condition of a film contained inside of the film cartridge, the apparatus comprising:

a feeder for thrusting a lead portion of the film from the film cartridge loaded in the apparatus and conveying the film to a predetermined position;

a detector for detecting an abnormality in a film feeding operation whereby said film feeding operation is not executed by said feeder normally; and a controller for controlling said film feeding operation, said controller rewinding the film when said abnormality is detected by said detector, and setting the exposing condition of the indicator at a state that the film is exposed, the feeder including a driving motor, and said detector including a first sensor for detecting a rotation of said driving motor and a second sensor for detecting a perforation at said predetermined position of the film on a film feeding path.

11. The apparatus as claimed in claim 10, wherein said detector detects said abnormality when a detection signal is not output from said first sensor normally.

12. The apparatus as claimed in claim 10, wherein said detector detects said abnormality when the film is not detected by said second sensor regardless that a detection signal is output from said first sensor normally and said film feeding operation is executed by a predetermined amount.

13. An apparatus using a film cartridge having an indicator which indicates an exposing condition of a film contained inside of the film cartridge, the apparatus comprising:

a feeder for thrusting a lead portion of the film from the film cartridge loaded in the apparatus and conveying the film to a predetermined position;

a detector for detecting an abnormality in a film feeding operation whereby said film feeding operation is not executed by said feeder normally; and a controller for controlling said film feeding operation, said controller rewinding the film when said abnormality is detected by said detector, and setting the exposing condition of the indicator at a state that the film is exposed, said detector including a first sensor detecting rotation of a film winding spool of the film cartridge and/or a second sensor detecting a film on a film feeding path at said predetermined position.

14. The apparatus as claimed in claim 13, wherein said detector detects said abnormality when a detection signal is not output from said first sensor normally.

15. The apparatus as claimed in claim 13, wherein said detector detects said abnormality when the film is not detected by said second sensor ignoring that a detection signal is output from said first sensor normally and said film feeding operation is executed by a predetermined amount.

16. An apparatus using a film cartridge having an indicator which indicates an exposing condition of a film contained inside of the film cartridge, wherein the apparatus comprises:

a reader for reading an indicator showing an exposure condition of a film cartridge loaded in the apparatus;

a feeder for thrusting a lead portion of the film from the film cartridge, said feeder including a driving motor for driving a film winding spool of the film cartridge;

a detector for detecting an abnormality that a film feeding operation by the feeder is not executed normally, said detector having a first sensor for detecting the amount of rotation of said film winding spool of the film cartridge; and a controller for controlling the film during a film feeding operation, whereby the film is rewound when said abnormality is detected by said detector and said indicator is reset to an original indication state of said exposure condition, said original indication state being determined at a time of the film cartridge loading based on the detection by said reader.

17. An apparatus using a film cartridge having an indicator which indicates an exposing condition of a film contained inside of the film cartridge, wherein the apparatus comprises:

feeder means for thrusting a lead portion of the film from a film cartridge loaded in the apparatus and conveying the film to a predetermined position, said feeder means includes a drive motor for driving the thrusting of said feeder means;

detector means for detecting an abnormality in a film feeding operation, said detector includes a first sensor for detecting an amount of rotation of said driving motor, or a film winding spool, and a second sensor for detecting a film on a film feeding path at a predetermined position, said detector means detects said abnormality when a rotation signal is not output from said first sensor, or when a leading portion of the film is not fed to said predetermined position so as to be detected by said second sensor even if said rotation signal is received from said first sensor; and controller means for controlling said film feeding operation, said controller means rewinds the film when said abnormality is detected by said detector means, and said controller means sets said exposing condition of said indicator at a state that the film is exposed.

18. An apparatus using a film cartridge having an indicator which indicates an exposing condition of a film contained inside of the film cartridge, the apparatus comprising:

a reader for reading the indicator showing the exposure condition of the film cartridge loaded in the apparatus;

a feeder for thrusting a lead portion of the film from the film cartridge;

a detector for detecting that an abnormality occurs in a film advancement executed by the feeder; and a controller for controlling the film during a film feeding operation, whereby the film is rewound when said abnormality is detected by said detector and said indicator is reset to an original indication state of said exposure condition, said original indication state being determined at a time of the film cartridge loading based on the detection by said reader, said detector including one of a first sensor for detecting rotation of said driving motor of said feeder and a second sensor for detecting a perforation adjacent said lead portion of the film on a film feeding path.

19. The apparatus as claimed in claim 18, wherein said detector detects said abnormality based on that a detection signal output from said first sensor is improper.

20. The apparatus as claimed in claim 18, wherein said detector detects said abnormality based on that the film is not detected by said second sensor regardless that a detection signal is output from said first sensor normally and said film feeding operation is executed by a predetermined amount.

21. An apparatus using a film cartridge having an indicator which indicates an exposing condition of a film contained inside of the film cartridge, the apparatus comprising:
- a reader for reading the indicator showing the exposure condition of the film cartridge loaded in the apparatus;
- a feeder for thrusting a lead portion of the film from the film cartridge;
- a detector for detecting that an abnormality occurs in a film advancement executed by the feeder;
- a controller for controlling the film during a film feeding operation, whereby the film is rewound when said abnormality is detected by said detector and said indicator is reset to an original indication state of said exposure condition, said original indication state being determined at a time of the film cartridge loading based on the detection by said reader,
- said detector including one of a first sensor for detecting a rotation of a film winding spool of the film cartridge and a second sensor for detecting a film on a film feeding path.

22. The apparatus as claimed in claim 21,
wherein the detector detects said abnormality based on that a detection signal detected from said first sensor is improper.

23. The apparatus as claimed in claim 21,
wherein said detector detects said abnormality based on that the film is not detected by said second sensor regardless that a detection signal is output from said first sensor properly and said film feeding operation is executed by a predetermined amount.

24. An apparatus using a film cartridge having an indicator which indicates an exposing condition of a film contained inside of the film cartridge, the apparatus comprising:
- a feeder for thrusting a lead portion of the film from the film cartridge loaded in the apparatus and conveying the film to a predetermined position;
- a detector for detecting an abnormality in a film feeding operation whereby said film feeding operation is not executed by said feeder normally; and
- a controller for controlling said film feeding operation, said controller rewinding the film when said abnormality is detected by said detector, and setting the exposing condition of the indicator at a state that the film is exposed,
- the feeder including a driving motor, and
- said detector including one of a first sensor for detecting a rotation of said driving motor and a second sensor for detecting a perforation at said predetermined position of the film on a film feeding path.

25. The apparatus as claimed in claim 24,
wherein said detector detects said abnormality when a detection signal is not output from said first sensor normally.

26. The apparatus as claimed in claim 24,
wherein said detector detects said abnormality when the film is not detected by said second sensor regardless that a detection signal is output from said first sensor normally and said film feeding operation is executed by a predetermined amount.

27. An apparatus using a film cartridge having an indicator which indicates an exposing condition of a film contained inside of the film cartridge,
wherein the apparatus comprises:
- a reader for reading the indicator showing the exposure condition of the film cartridge loaded in the apparatus;
- a feeder for thrusting a lead portion of the film from the film cartridge;
- a detector for detecting that an abnormality occurs in a film advancement executed by the feeder by determining that the film fails to reach a predetermined position; and
- a controller for controlling the film during a film feeding operation, whereby the film is rewound when said abnormality is detected by said detector and said indicator is reset to an original indication state of said exposure condition, said original indication state being determined at a time of the film cartridge loading based on the detection by said reader.

* * * * *